United States Patent
Niikura et al.

(10) Patent No.: US 12,375,800 B2
(45) Date of Patent: Jul. 29, 2025

(54) LENS DEVICE, LENS DEVICE EMBEDDED SYSTEM, LENS DEVICE EMBEDDED INSPECTION DEVICE, AND OPERATION PROGRAM

(71) Applicant: CBC CO., LTD., Tokyo (JP)

(72) Inventors: Tsunemi Niikura, Tokyo (JP); Katsuya Hirano, Tokyo (JP)

(73) Assignee: CBC CO., LTD. (JP)

( * ) Notice: Subject to any disclaimer, the term of this patent is extended or adjusted under 35 U.S.C. 154(b) by 125 days.

(21) Appl. No.: 18/014,865

(22) PCT Filed: Sep. 24, 2020

(86) PCT No.: PCT/JP2020/036067
§ 371 (c)(1),
(2) Date: Jan. 6, 2023

(87) PCT Pub. No.: WO2022/064603
PCT Pub. Date: Mar. 31, 2022

(65) Prior Publication Data
US 2023/0292001 A1 Sep. 14, 2023

(51) Int. Cl.
*H04N 23/661* (2023.01)
*G02B 7/09* (2021.01)
(Continued)

(52) U.S. Cl.
CPC ........... *H04N 23/661* (2023.01); *G02B 7/09* (2013.01); *G02B 7/102* (2013.01); *G03B 3/10* (2013.01);
(Continued)

(58) Field of Classification Search
CPC ........ H04N 23/54; H04N 23/55; H04N 23/57; H04N 23/66; H04N 23/661; H04N 23/665;
(Continued)

(56) References Cited

U.S. PATENT DOCUMENTS 5,839,002 A * 11/1998 Miyake ............... G02B 7/08
396/91
6,809,759 B1 * 10/2004 Chiang ............... H04N 23/63
348/333.13
(Continued)

FOREIGN PATENT DOCUMENTS

JP  H0882827 A  3/1996
JP  2009-533996 A  9/2009
(Continued)

OTHER PUBLICATIONS

European Search Report issued in the corresponding European Patent Application No. 20955197.7; mailed May 8, 2024 (total 8 pages).
(Continued)

*Primary Examiner* — Twyler L Haskins
*Assistant Examiner* — Akshay Trehan
(74) *Attorney, Agent, or Firm* — Harness, Dickey & Pierce, P.L.C.

(57) ABSTRACT

A lens device is provided that outputs an action state of a lens while utilizing a multi-purpose communication interface capable of connecting a large number of camera devices. The lens device includes: a lens mechanism that is built into a lens main body and forms the optical image; a drive control unit that is built into the lens main body and drive-controls the lens mechanism; a control unit that includes a microcomputer and outputs a drive control signal to the drive control unit; a first connection unit that forms a first communication interface capable of having input/output communication with the control unit, and is capable of connecting to a network; and a second connection unit that includes a second communication interface capable of outputting a signal from the control unit.

16 Claims, 13 Drawing Sheets

(51) Int. Cl.
| | |
|---|---|
| *G02B 7/10* | (2021.01) |
| *G03B 3/10* | (2021.01) |
| *G03B 5/00* | (2021.01) |
| *G03B 7/26* | (2021.01) |
| *G03B 13/34* | (2021.01) |
| *G03B 17/12* | (2021.01) |
| *G03B 17/14* | (2021.01) |
| *H04N 23/54* | (2023.01) |
| *H04N 23/55* | (2023.01) |
| *H04N 23/57* | (2023.01) |
| *H04N 23/60* | (2023.01) |
| *H04N 23/69* | (2023.01) |

(52) U.S. Cl.
CPC ............... *G03B 5/00* (2013.01); *G03B 7/26* (2013.01); *G03B 13/34* (2013.01); *G03B 17/12* (2013.01); *G03B 17/14* (2013.01); *H04N 23/54* (2023.01); *H04N 23/55* (2023.01); *H04N 23/57* (2023.01); *H04N 23/665* (2023.01); *H04N 23/69* (2023.01); *G03B 2205/0046* (2013.01); *G03B 2205/0053* (2013.01); *G03B 2206/00* (2013.01)

(58) Field of Classification Search
CPC .......... H04N 23/69; G02B 7/09; G02B 7/102; G03B 17/12; G03B 17/14; G03B 17/566; G03B 3/10; G03B 5/00; G03B 7/26; G03B 13/34; G03B 2205/0046; G03B 2205/0053; G03B 2206/00
See application file for complete search history.

(56) References Cited

U.S. PATENT DOCUMENTS

| | | |
|---|---|---|
| 9,544,477 B2 | 1/2017 | Kaku et al. |
| 2008/0084474 A1 | 4/2008 | Bergstrom et al. |
| 2010/0046085 A1* | 2/2010 | Yumiki ............... G03B 17/14 |
| | | 359/695 |
| 2011/0102618 A1* | 5/2011 | Yamaya ............... H04N 23/663 |
| | | 348/222.1 |
| 2012/0307091 A1* | 12/2012 | Yumiki ............... H04N 23/66 |
| | | 348/E5.042 |
| 2014/0160304 A1* | 6/2014 | Galor ............... H04N 23/66 |
| | | 348/207.1 |
| 2015/0195442 A1* | 7/2015 | Pacurariu ............... H04N 23/66 |
| | | 348/211.2 |
| 2015/0326788 A1* | 11/2015 | Tsuge ............... H04N 23/63 |
| | | 348/211.1 |
| 2016/0018717 A1* | 1/2016 | Kuwakino ............... G03B 9/07 |
| | | 359/230 |
| 2016/0198080 A1* | 7/2016 | Ito ............... H04N 23/631 |
| | | 348/207.11 |
| 2017/0108661 A1* | 4/2017 | Endo ............... H04N 23/55 |
| 2017/0187950 A1 | 6/2017 | Uchida |
| 2018/0376131 A1* | 12/2018 | Handa ............... H04N 13/282 |
| 2019/0265681 A1* | 8/2019 | Horie ............... H04N 23/54 |

FOREIGN PATENT DOCUMENTS

| | | |
|---|---|---|
| JP | 2011-205552 A | 10/2011 |
| JP | 5893746 B2 | 3/2016 |
| JP | 2017-063307 A | 3/2017 |
| JP | 2019-008429 A | 1/2019 |
| TW | 0555538 B | 10/2003 |
| TW | 201914290 A | 4/2019 |

OTHER PUBLICATIONS

International Search Report (English and Japanese) issued in PCT/JP2020/036067, mailed Dec. 15, 2020; ISA/JP (6 pages).

Office Action issued in Taiwanese Patent Application No. 110135293, mailed Jun. 8, 2022 (6 pages).

* cited by examiner

LENS DEVICE, LENS DEVICE EMBEDDED SYSTEM, LENS DEVICE EMBEDDED INSPECTION DEVICE, AND OPERATION PROGRAM

CROSS REFERENCE TO RELATED APPLICATIONS

This application is a U.S. National Phase Application under 35 U.S.C. 371 of International Application No. PCT/JP2020/036067, filed on Sep. 24, 2020. The entire disclosure of the above application is expressly incorporated by reference herein.

FIELD

The present invention relates to a lens device that is capable of being connected to an external operation terminal via a network and used for industrial inspections and the like, a lens device embedded system, a lens device embedded inspection device, and an operation program. More specifically, the present invention relates to a lens device capable of outputting a response signal of a lens action of a lens main body in real time, a lens device embedded system, a lens device embedded inspection device, and an operation program.

BACKGROUND

As camera devices for surveillance, industrial use, and the like, an IP camera (network camera), a CCTV (Closed-circuit Television) camera, an FA (Factory Automation) camera, and the like are used widely. Furthermore, as the camera device for such usages, there is a lens device configured to include a compatible lens mount such as a C mount or CS mount so as to be able to mount a single focal lens or a variable focal lens (zoom lens, varifocal lens, or the like) onto the lens mount. In a combination of the compatible camera and the lens, lens mechanisms of the focus, zoom, and iris are drive-controlled to form an optical image through the lens mechanisms, the optical image is photo-electrically converted to image data of an electric signal by an imaging element, and the image data is image-processed to display a visible image on an operation screen.

With the single focus lens and the variable focus lens, it is possible to perform focus adjustment, zoom adjustment, and iris adjustment by driving the lens mechanisms of the focus, zoom, and iris, and products motorized by using a DC motor or a stepping motor for performing such adjustment are widely known.

Japanese Patent No. 5893746, for example, discloses a camera device in which a DC motor or a stepping motor is applied to perform drive-control of the lens mechanisms, and the lens mechanisms are remotely operated by an operation terminal.

As for the CCTV lens of Japanese Patent No. 5893746, a control unit is embedded into the varifocal lens, and power is supplied to the control unit and the motor by an external control device. Furthermore, the substrate of the control unit is configured with a flexible circuit, and it is possible to directly wire the flexible circuit to each of the lens driving motors. This makes it possible to suppress the number of wirings, which results in simplifying the motor wiring.

Furthermore, a microcomputer is provided on the flexible circuit, and the microcomputer is connected to the external control device via a serial communication line and controls each motor of the CCTV lens based on the command from the control device on the camera side to perform zoom adjustment and focus adjustment. As described, the CCTV lens of Japanese Patent No. 5893746 is designed to simplify wirings to each of the lens driving motors and to simplify lens control.

In Japanese Patent No. 5893746, the connection mode between the lens and the operation terminal is in a one-to-one relation via a cable. Therefore, in order to implement an n-to-one relation for the connection mode between the lens and the operation terminal, it is concerned that the configuration and control of the communication line may become complicated.

Therefore, the lens device according to the present invention is developed by the inventors of the present invention in order to enable output of the operation state of the lens, while utilizing a multi-purpose interface capable of connecting a large number of camera devices.

It is an object of the lens device according to the present invention to provide a lens device preferable for inspections and the like using image processing, a lens device embedded system, a lens device embedded inspection device, and an operation program by providing a multi-purpose communication interface and, separately from the multi-purpose communication interface, a signal line for outputting a real-time trigger signal for making it possible to output, by a separate signal, action information of the lens that requires a real-time property in order to make it possible to lighten the load on the host side that is the operation terminal during a period from the start of a drive control of the lens until the lens action is completed and to be able to capture an image and perform image processing immediately after the lens action is completed.

SUMMARY

In order to achieve the foregoing object, the lens device according to the present invention is a lens device that captures an optical image by a camera main body, the lens device including: a lens mechanism that is built into a lens main body, the lens mechanism forming the optical image; a drive control unit that is built into the lens main body, the drive control unit drive-controlling the lens mechanism; a control unit that outputs a drive control signal to the drive control unit; a first connection unit that includes a first communication interface capable of communicating with the control unit, the first connection unit being capable of connecting to a network; and a second connection unit that includes a second communication interface capable of outputting a signal from the control unit.

The lens mechanism of the lens device according to the present invention starts an action by a moving action command input to the control unit from the first communication interface of the first connection unit, and the control unit outputs, from the second communication interface of the second connection unit, an action completion signal notifying that the lens mechanism has completed the action.

In the lens device according to the present invention, the lens main body is drive-controlled independently from the camera main body based on a moving action command from the control unit.

In the lens device according to the present invention, an operation terminal including a computer is connected to the network where the lens device is connected and, after receiving a moving action command of the lens mechanism output from the operation terminal to the control unit of the lens device via the first communication interface on the network, the control unit of the lens device outputs an action completion signal of the lens mechanism to the operation terminal via the second communication interface.

The first connection unit of the lens device according to the present invention further includes a power supply interface for supplying power to the lens main body.

A lens device embedded system according to the present invention includes: a camera main body that captures an optical image; a lens device including a lens main body that is coupled to the camera main body via a mount; and an operation terminal that controls the lens device via a network, in which the lens device includes: a lens mechanism that is built into the lens main body, the lens mechanism forming the optical image; a drive control unit that is built into the lens main body, the drive control unit drive-controlling the lens mechanism; a control unit that outputs a drive control signal to the drive control unit; a first connection unit that includes a first communication interface capable of communicating with the control unit, the first connection unit being capable of connecting to the network; and a second connection unit that includes a second communication interface capable of outputting a signal to the operation terminal from the control unit.

In the lens device embedded system according to the present invention, the lens main body is controlled independently from the camera main body based on a moving action command from the operation terminal, and an action completion signal is output to the operation terminal via the second communication interface of the second connection unit of the lens device.

A lens device embedded inspection device according to the present invention performing an inspection of an inspection target includes: a camera main body that captures an optical image; a lens device including a lens main body that is coupled to the camera main body via a mount; and an operation terminal that controls the lens device via a network, in which the lens device includes: a lens mechanism that is built into the lens main body, the lens mechanism forming the optical image; a drive control unit that is built into the lens main body, the drive control unit drive-controlling the lens mechanism; a control unit that outputs a drive control signal to the drive control unit; a first connection unit that includes a first communication interface capable of communicating with the control unit, the first connection unit being capable of connecting to the network; and a second connection unit that includes a second communication interface capable of outputting a signal to the operation terminal from the control unit.

An operation program according to the present invention for controlling a lens device that includes: a lens mechanism that is built into a lens main body, the lens mechanism forming the optical image; a drive control unit that is built into the lens main body, the drive control unit drive-controlling the lens mechanism; a control unit that outputs a drive control signal to the drive control unit; a first connection unit that includes a first communication interface capable of communicating with the control unit, the first connection unit being capable of connecting to a network; and a second connection unit that includes a second communication interface capable of outputting a signal to the operation terminal from the control unit, the operation program including: a function of receiving a command from the operation terminal input to the first communication interface of the first connection unit; and a function of executing the command according to the command received from the operation terminal, and causing the lens device to execute: when a command for moving a lens position of the lens mechanism is received from the operation terminal, a function of moving the lens position by outputting the drive control signal to the drive control unit; a function of checking whether a lens moving action of the lens mechanism is completed; and after the lens moving action of the lens mechanism is completed, a function of outputting, to the operation terminal, a trigger signal as an action completion signal of the lens mechanism from the second communication interface.

The operation program for controlling the lens device according to the present invention causes the lens device to execute: a function of storing the lens position of the lens mechanism as address information; a function of reading out the address information of the lens mechanism stored in advance, and outputting, to the lens device, a command for moving to a moving position of the read-out address information by the first communication interface of the network; and a function of receiving the action completion signal of the lens mechanism from the second communication interface.

Advantageous Effects of Invention

According to the present invention, it is possible to perform inspections at a high speed by capturing an image by the camera upon the start of driving the lens mechanism, by providing the multi-purpose interface and, separately from the multi-purpose interface, the signal line for outputting the real-time trigger signal not dependent on the multi-purpose interface and by outputting, by a separate signal, the information requiring a real-time property from the lens device.

Furthermore, according to the present invention, it is possible to lighten the load on the host side that is the operation terminal until there is a response from the lens device, by providing the multi-purpose interface and, separately from the multi-purpose interface, the signal line for outputting the real-time trigger signal not dependent on the multi-purpose interface and by outputting, by a separate signal, the information requiring a real-time property from the lens device.

Moreover, according to the present invention, it is possible to expand the connection mode between the lens device and the operation terminal to the n-to-one or n-to-n connection mode by connecting the lens device and the operation terminal via the network, since the lens mechanism built-into the lens main body, the drive control unit built-into the lens main body for drive-controlling the lens mechanism, the central processing unit (the control unit) that outputs the drive control signal to the drive control unit, and the network that forms the communication interface for the central processing unit (the control unit) are provided.

Furthermore, the lens device according to the present invention is capable of outputting the lens action state in real time while utilizing the multi-purpose communication interface capable of connecting a large number of camera devices, so that, unlike the conventional cases, there is no delay in the processing on the operation terminal/control side, which may be caused when waiting for confirmation that the lens action is completed. This makes it possible to perform another processing while the operation terminal is waiting for confirmation that the lens action is completed, so that the processing efficiency of the operation terminal is improved.

Moreover, according to the present invention, the lens device includes, separately from the multi-purpose communication interface, the signal line that outputs a real-time trigger signal, and the lens device and the operation terminal are directly connected via the signal line. Therefore the configuration between the devices can be simplified.

Furthermore, according to the present invention, the signal line of the second connection unit of the lens device is only for the output from the lens device, so that it can be used only when a real-time property is required.

The connection mode between a plurality of lens devices and the operation terminal can be expanded to the n-to-one mode, so that, in a case of industrial cameras and the like requiring a real-time property in response, it is possible to instantly correspond to a case where a plurality of lens devices are to be synchronized or an arbitrary number of lens devices are selected and drive-controlled among a plurality of lens devices.

Since the lens device according to the present invention can be operated from the operation terminal independently from the camera main body, it is possible to control a plurality of lens devices and to observe the information of each of the lens devices in real time.

Since the lens device is drive-controlled independently from the camera main body according to the drive control signal from the control unit, it is possible to employ a configuration where a plurality of lens devices are aggregated via the network to be connected to a single operation terminal or a plurality of operation terminals are connected to the network that has a plurality of lens devices. Therefore, it is possible to expand the range of application of the lens device.

The operation terminal that controls the lens device stores the lens position of the lens mechanism set in advance, so that it is possible to control the lens to be at a prescribed position at a high speed by reading out the stored lens positional information in inspections and the like performed by image processing.

Furthermore, since the operation terminal that controls the lens device can receive the lens action completion signal of the lens mechanism in real time, high-speed processing can be performed in the inspection device that performs inspections by processing the image from the camera main body.

BRIEF DESCRIPTION OF THE DRAWINGS

FIG. 2 illustrate external appearances of a varifocal lens as a lens main body of the embodiment of the present invention, in which

FIG. 4 are block diagrams illustrating examples of a network where the lens devices and the operation terminal according to the embodiment of the present invention are in an n-to-one connection mode, in which

DETAILED DESCRIPTION

Hereinafter, modes for embodying a lens device, a lens device embedded system, a lens device embedded inspection device, and an operation program according to the present invention will be described in detail with reference to the accompanying drawings. Note that the lens device according to the present invention is designed to output, by a separate signal, action information of a lens that requires a real-time property without using a multi-purpose communication interface so as to be able to lighten the load on a host side that is an operation terminal side during a period from start of a driving action of a lens until there is a response indicating completion of the lens action and, further, to be able to capture an image by a camera device immediately after completion of the lens action and perform an inspection by image processing at a high speed.

Figure 1:
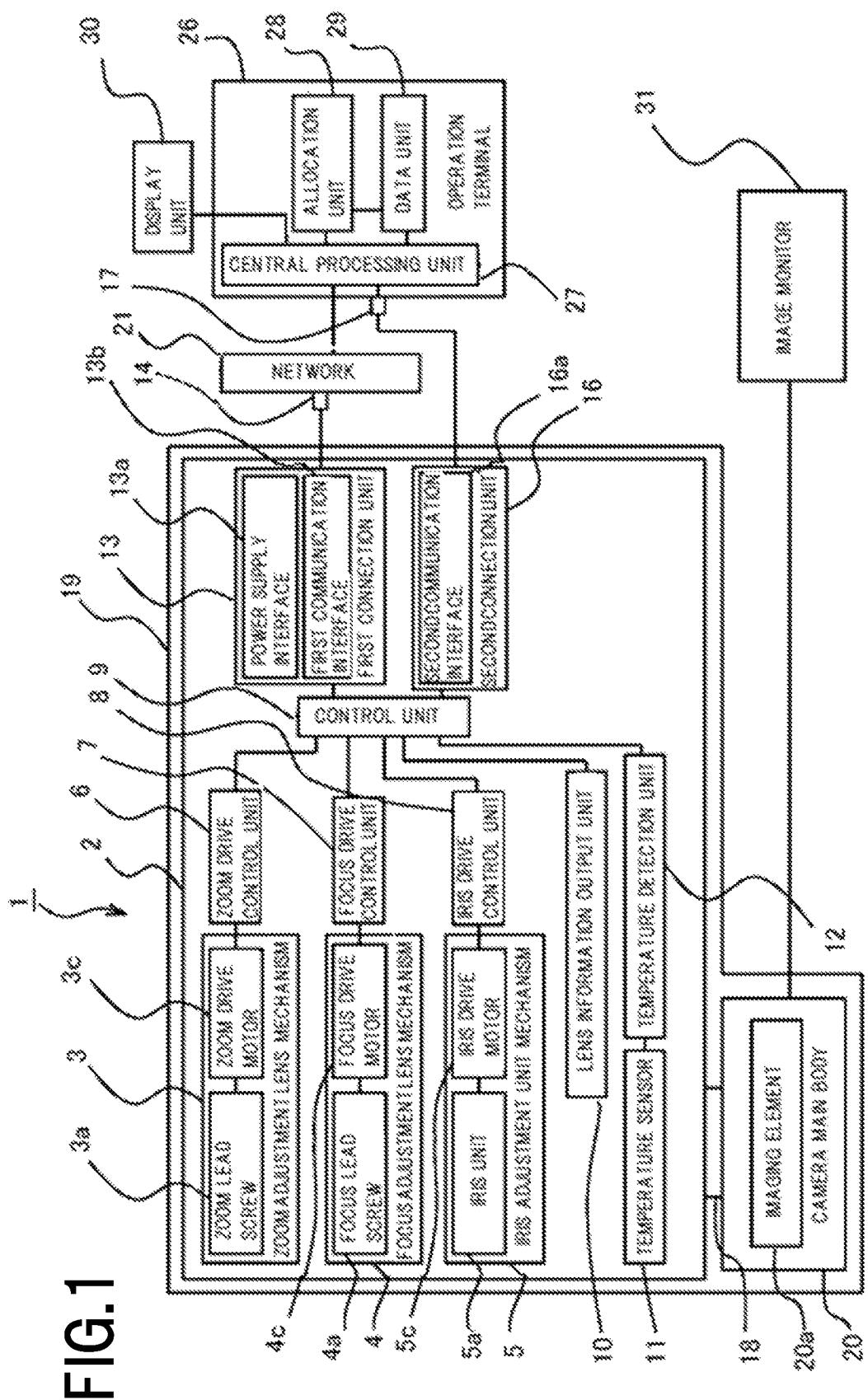
FIG. 1 is a block diagram illustrating configurations of a lens device and an operation terminal according to an embodiment of the present invention.

FIG. 1 is a block diagram illustrating configurations of a lens device and an operation terminal according to an embodiment of the present invention. As illustrated in FIG. 1, a lens device 1 according to the embodiment of the present invention is the lens device 1 for capturing optical images by a camera device 19. The lens device 1 includes: a zoom adjustment lens mechanism 3, a focus adjustment lens mechanism 4, and an iris adjustment unit mechanism 5 for forming an optical image (the zoom adjustment lens mechanism 3, the focus adjustment lens mechanism 4, and the iris adjustment unit mechanism 5 are referred to as lens mechanisms), which are built into a lens main body 2; a zoom drive control unit 6, a focus drive control unit 7, and an iris drive control unit 8 as drive control units for drive-controlling the lens mechanisms, which are built into the lens main body 2; a control unit 9 that outputs drive control signals to the drive control units; a first connection unit 13 that forms a power supply interface 13a for supplying power to the lens main body 2, and a first communication interface 13b capable of communicating with the control unit 9; and a second connection unit that includes a second communication interface 16a capable of outputting a signal from the control unit 9.

The zoom adjustment lens mechanism 3 for performing zoom adjustment is configured with a zoom lead screw 3a and a zoom drive motor 3c for changing the focal length by moving the lens. The focus lens mechanism 4 for performing focus adjustment by moving the lens is configured with a focus lead screw 4a and a focus drive motor 4c. Furthermore, the iris adjustment unit mechanism 5 for performing iris adjustment is configured with an iris unit 5a and an iris drive motor 5c for changing an aperture F-number.

The zoom drive control unit 6 drive-controls the zoom drive motor 3c according to a command from the control unit 9 that controls the zoom drive motor 3c of the zoom adjustment lens mechanism 3. Thereby, zoom adjustment of the zoom adjustment lens mechanism 3 is performed.

The focus drive control unit 7 drive-controls the focus drive motor 4c according to a command from the control unit 9 that controls the focus drive motor 4c of the focus adjustment lens mechanism 4. Thereby, focus adjustment of the focus drive control unit 7 is performed.

The iris drive control unit 8 drive-controls the iris drive motor 5c according to a command from the control unit 9 that controls the iris drive motor 5c of the iris adjustment unit mechanism 5. Thereby, iris adjustment of the iris adjustment unit mechanism 5 is performed.

The control unit 9 has a built-in microcomputer (not shown), and outputs a drive control signal to each of the drive control units to perform zoom adjustment, focus adjustment, iris adjustment, and the like. Furthermore, the control unit 9 is capable of communicating with an external operation terminal via a network 21, and also capable of directly outputting action completion signals of the drive motors of the lens mechanisms to an operation terminal 26.

While the lens device 1 illustrated in FIG. 1 is described by referring to a case that includes the zoom adjustment lens mechanism 3, the focus adjustment lens mechanism 4, and the iris adjustment unit mechanism 5, it is also possible to include an optical filter lens mechanism and an extender adjustment lens mechanism as necessary.

The optical filter adjustment lens mechanism is used for adjusting brightness of an image as well as for improving image contrast, transmitting and reflecting a specific wavelength, and dividing a single image into two independent images by a specific branching ratio by driving the filter using an optical filter drive motor. Furthermore, the extender adjustment lens mechanism is mounted between a master lens of the lens main body 2 and a camera main body 20 to be used for extending the focal length of the master lens by 1.4 times, 2 times, and the like by driving the lens by an extender drive motor.

As the drive motors for the zoom drive motor 3c, the focus drive motor 4c, and the iris drive motor 5c illustrated in FIG. 1, stepping motors are used. Hereinafter, the zoom adjustment motor 3c may also be referred to as a zoom stepping motor 3c, the focus drive motor 4c as a focus stepping motor 4c, and the iris drive motor 5c as an iris stepping motor 5c. As for those drive motors, DC motors may be used instead and, further, the stepping motors and the DC motors may be used in combination by corresponding to the purpose of use.

Furthermore, as illustrated in FIG. 1, the lens main body 2 includes a lens information output unit 10 that stores characteristic information indicating specifications of the lens functions regarding the focal length and the maximum aperture of the lens and identification information for identifying the lens main body 2. The lens information output unit 10 is configured to transmit the characteristic information and the identification information to the operation terminal 26 via the control unit 9, the network 21, and a central processing unit 27. Note here that the characteristic information means the specifications of the lens functions such as the focal length, the maximum aperture, and the like of the lens for each lens device. The identification information is the information for identifying the lens main body 2, such as the model name of the lens, the serial number of the lens, and the like.

By outputting information, which is allocated for identifying each of a plurality of lens main bodies 2, as the identification information to the operation terminal 26 by the lens information output unit 10 of the lens main body 2 illustrated in FIG. 1, the operation terminal 26 can uniquely identify the lens device 1 when there are a plurality of lens devices 1. The lens information output unit 10 in the embodiment illustrated in FIG. 1 is provided to output the characteristic information and the identification information. However, the characteristic information and the identification information may be separated, and the characteristic information may be stored in the lens information output unit 10, while a lens main body information output unit storing the identification information for identifying the lens main body 2 may be provided so as to output the identification information from the lens main body information output unit.

The lens device illustrated in FIG. 1 includes a temperature sensor 11 that is mounted onto the lens main body 2 and measures the ambient temperature of the lens main body 2, and a temperature detection unit 12 that outputs information of the ambient temperature according to a measurement signal from the temperature sensor 11. The temperature information from the temperature detection unit 12 is output from the control unit 9 to the operation terminal 26 via the network 21.

The lens device 1 according to the present invention includes the first connection unit 13 that includes the power supply interface 13a for supplying power to the lens main body 2 and the first communication interface 13b that is connected to and capable of communicating with the control unit 9. Therefore, the first connection unit 13 is connected to the network 21, and the control unit 9 of the lens main body 2 and the central processing unit 27 of the operation terminal 26 are connected via the network 21, thereby securing the power of the lens main body 2 within the range of the allowable voltage and allowable current of the power supply interface 13a of the first connection unit 13, that is, the network 21. Furthermore, it is possible to have communication with the operation terminal 26 and the central processing unit 27 by the first communication interface 13b of the first connection unit 13.

The configuration where the power supply interface 13a for supplying power to the lens main body 2 is provided in the first connection unit 13 is described above. However, the power supply interface may not be provided in the first connection unit, and a dedicated interface for power supply may be provided separately from the first connection unit 13 connected to the network, for example, to supply power to the lens main body 2.

Note that the first communication interface 13b of the first connection unit 13 is configured with a multi-purpose communication interface such as I2C (Inter Integrated Circuit), USB, Ethernet, or RS485, for example.

Furthermore, the lens device 1 of the present invention includes the second connection unit 16 that has the second communication interface 16a capable of outputting a signal from the control unit 9. The second connection unit 16 outputs a signal indicating that the drive motor is driven to start movement of the lens of the lens mechanism and, thereafter, the drive motor is stopped and the lens mechanism has completely moved to a prescribed position. Unlike the first connection unit 13, the second connection unit 16 is not connected to the network 21, so that the signals from the second communication unit 16 are directly output to the operation terminal 26.

While an implementation mode where the output signal of the second connection unit 16 is a lens action completion signal is described above. However, the output mode of the second connection unit 16 is not limited thereto, but may be used as a lens action state signal such as a signal for outputting a state of the lens while moving, for example.

In FIG. 1, the first connection unit 13 and the second connection unit 16 of the lens main body 2 are electrically connected to a control substrate 9a (shown in FIG. 2) with the control unit 9 loaded thereon, and the control substrate 9a is built into the lens main body 2 illustrated in FIG. 1. Thereby, since the power supply interface 13a for supplying power is connected to the control substrate 9a, the power is supplied to each of the drive motors (the zoom drive motor 3c, the focus drive motor 4c, and the iris drive motor 5c).

The lens device 1 illustrated in FIG. 1 is optically and physically coupled to the camera main body 20 via a C mount or CS mount 18.

As illustrated in FIG. 1, the camera device 19 is configured with: the lens device 1 for forming an optical image with the lens mechanisms; and the camera main body 20 that outputs, to an image monitor 31, a signal acquired by converting an optical image formed by the lens mechanisms using an imaging element 20a as an image signal.

The camera device 19 may include, in the camera main body 20, an image display unit that processes the image signal, which is photoelectrically converted by the imaging element 20a, into a visible image and displays the processed visible image on a screen.

Furthermore, as illustrated in FIG. 1, the lens device 1 is connected to the operation terminal 26 via the network 21. The operation terminal 26 includes: the central processing unit 27 connected to the control unit 9 of the lens main body 2 via the network 21; an allocation unit 28; a data unit 29; and a display unit 30 for displaying information and inputting information. The central processing unit 27 of the operation terminal 26 has a computer, a program of the central processing unit 27 is stored in a storage device (not shown), and processing of various kinds of functions of the operation terminal 26 is implemented by executing the program by the CPU of the computer.

The central processing unit 27 of the operation terminal 26 in FIG. 1 is connected to the control unit 9 of the lens main body 2 via the network 21, and exchanges information with the allocation unit 28 and the data unit 29 of the operation terminal 26 as well as the drive control units and the lens information output unit 10 of the lens main body 2.

The allocation unit 28 of the operation terminal 26 in FIG. 1 recognizes the lens main body 2 based on a signal output from the lens information output unit 10 in response to an inquiry made on the control unit 9 from the central processing unit 27 with the network 21 being established between the control unit 9 and the central processing unit 27, and allocates the drive control units to the lens mechanisms of the lens main body 2 based on the recognized information. Furthermore, the data unit 29 of the operation terminal 26 in FIG. 1 outputs, to the drive control units of the lens main body 2 allocated by the allocation unit 28, a drive control signal configured with a lens moving position and the like. The drive control signal from the data unit 29 is input to the control unit 9, and output from the control unit 9 to the corresponding drive control units.

As described above, the allocation unit 28 and the data unit 29 of the operation terminal 26 are configured to exchange the information with the zoom drive control unit 6, the focus drive control unit 7, the iris drive control unit 8, the lens information output unit 10, and the temperature detection unit 12 of the lens device 1 via the route through the control unit 9, the network 21, and the central processing unit 27.

Figure 2A:
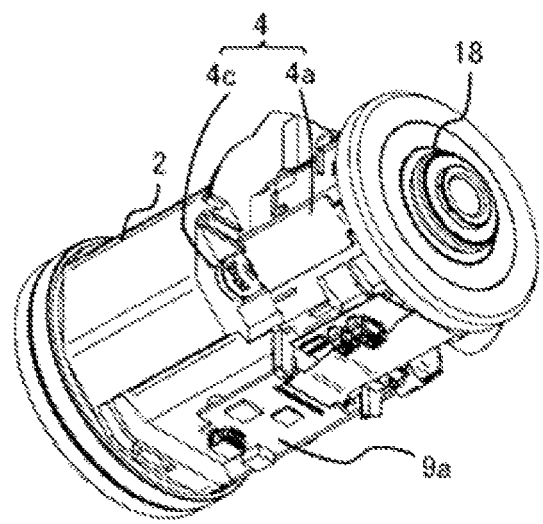
FIG. 2A is a perspective view illustrating the lens main body according to the embodiment of the present invention.
Figure 2B:
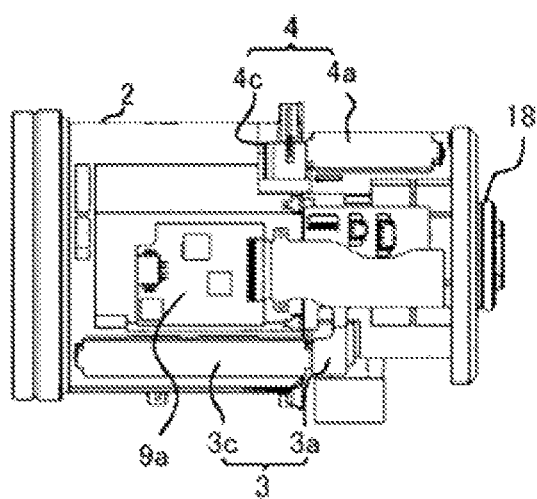
FIG. 2B is a side view of the lens main body according to the embodiment of the present invention.
Figure 2C:
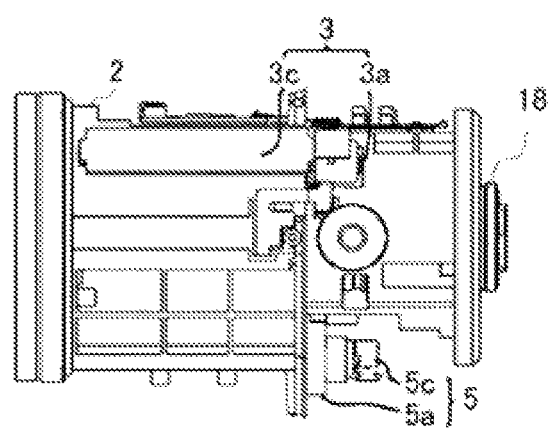
FIG. 2C is a side view illustrating a state where the lens main body according to the embodiment of the present invention is rotated by 90 degrees about the optical axis.

FIG. 2 illustrate the external appearances of the varifocal lens as the lens main body according to the embodiment of the present invention, in which FIG. 2A is a perspective view illustrating the lens main body according to the embodiment of the present invention, FIG. 2B is a side view of the lens main body according to the embodiment of the present invention, and FIG. 2C is a side view illustrating a state where the lens main body according to the embodiment of the present invention is rotated by 90 degrees about the optical axis.

The varifocal lens illustrated in FIG. 2 is a variable focal lens capable of changing the focal length (angel of view), and capable of adjusting the extent of the imaging range by changing the zoom magnification. Furthermore, when the zoom magnification is changed, the varifocal lens becomes out of focus. Therefore, it is necessary to adjust the focus, that is, to change the image forming position.

The varifocal lens illustrated in FIG. 2 includes the C mount or CS mount 18 on the end face of the lens main body 2 to couple the lens main body 2 to the camera main body 20. While the C mount or CS mount as a thread coupling type is used as the mount in FIGS. 2, the mount for coupling the lens device 1 and the camera main body 20 is not limited thereto.

Into the lens main body 2, embedded are: as illustrated in FIG. 2A and FIG. 2B, the focus lead screw 4a and the focus stepping motor 4c of the focus adjustment lens mechanism 4 for enabling focusing, and the control substrate 9a of the control unit 9 with the microcomputer loaded thereon; as illustrated in FIG. 2B and FIG. 2C, the zoom lead screw 3a and the zoom stepping motor 3c of the zoom adjustment lens mechanism 3 for varying the focal length by moving the lens; and as illustrated in FIG. 2C, the iris unit 5a and the iris stepping motor 5c of the iris adjustment unit mechanism 5 for varying the aperture F-number.

Figure 3A:
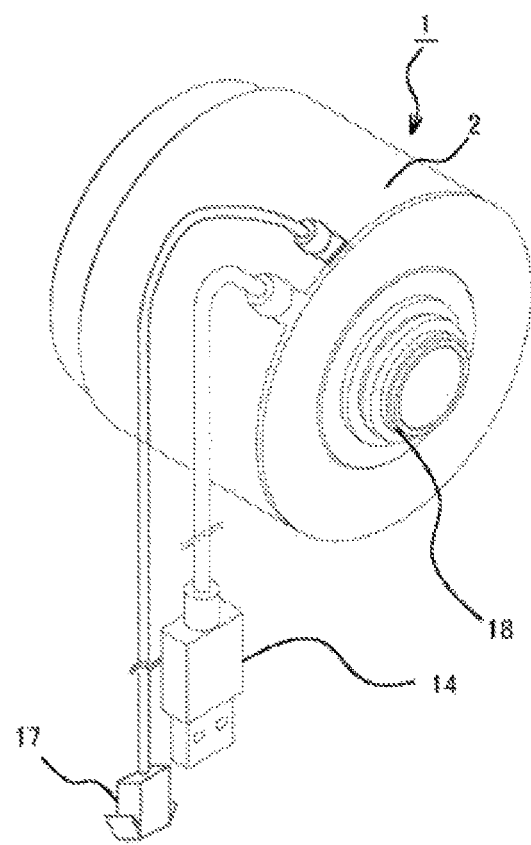
FIG. 3A is a perspective view of the lens main body viewed from the back side, in which a USB connector from a first connection unit and a connector from a second connection unit of the lens main body according to the embodiment of the present invention are led out.

Next, connectors for leading out the input/output terminals of the first connection unit 13 and the second connection unit 16 provided in the lens device 1 will be described. FIG. 3A is a perspective view of the lens device 1 viewed from the back side, when a USB connector 14 from the first connection unit 13 and a connector from the second connection unit 16 of the lens main body 2 are led out. In the lens device 1 illustrated in FIG. 3A, a cable having the USB connector 14 at its top end is connected to the first connection unit 13 of the lens main body 2, and the input/output terminal of the power supply interface 13a and the first communication interface 13b of the first connection unit 13 is led out to the outside of the lens main body 2 by the USB connector 14.

Furthermore, a cable having an output signal connector 17 as the connector for the second connection unit at its top end is connected to the second connection unit 16, and the output terminal of the second communication interface 16a of the second communication unit 16 is led out to the outside of the lens main body 2 by the output signal connector 17.

Furthermore, the lens device 1 illustrated in FIG. 3A is the lens device 1 for a camera to be mounted to the camera main body 20, and it is optically and physically coupled to the camera main body 20.

Figure 3B:
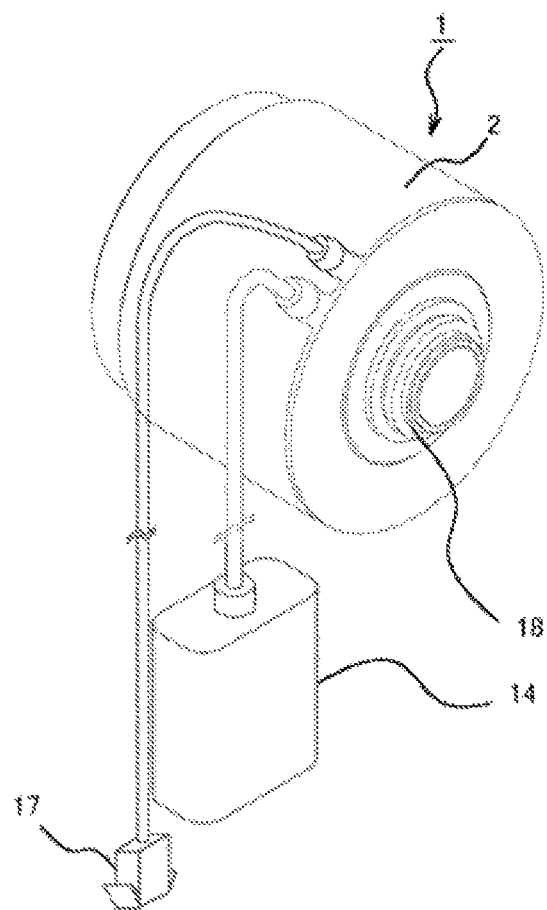
FIG. 3B is a perspective view of the lens main body viewed from the back side, in which an Ethernet connector from the first connection unit and the connector from the second connection unit of the lens main body according to the embodiment of the present invention are led out.

Furthermore, FIG. 3B is a perspective view of the lens main body 2 viewed from the back side, when an Ethernet connector 15 from the first connection unit 13 and a connector from the second connection unit 16 are led out from the lens main body 2.

In the lens device 1 illustrated in FIG. 3B, a cable having the Ethernet connector 15 at its top end is connected to the first connection unit 13 of the lens main body 2, and the input/output terminal of the power supply interface 13a and the first communication interface 13b of the first connection unit 13 is led out to the outside of the lens main body 2 by the Ethernet connector 15.

Furthermore, a cable having the output signal connector 17 as the connector for the second connection unit at its top end is connected to the second connection unit 16, and the output terminal of the second communication interface 16a of the second communication unit 16 is led out to the outside of the lens main body 2 by the output signal connector 17.

Note that the output signal connector 17 is illustrated as a cable connector in FIG. 3A and FIG. 3B. However, instead of the cable connector, the output signal connector 17 may be configured with a wireless system (infrared wireless, Bluetooth (registered trademark), or the like) to connect the second connection unit 16 and the central processing unit 27 (shown in FIG. 1) for enabling communication.

Furthermore, while the modes of leading out the input/output terminal of the first connection unit 13 provided in the lens device 1 from the lens main body 2 by the USB connector 14 and the Ethernet connector 15 are described by referring to FIG. 3, it is also possible to use I2C, for example, as the first communication interface 13b of the first connection unit 13 and lead out the input/output terminal of the power supply interface 13a and the first communication interface 13b by a connector for I2C. Furthermore, when a connector for the power supply interface is provided separately, the connector for I2C may be configured only with the first communication interface 13b. Moreover, instead of the output signal connector 17 for the second communication interface 16a, it is also possible to lead out the output terminal of the second communication interface 16a to the outside of the lens main body 2 by the connector for I2C.

Furthermore, the lens device 1 illustrated in FIG. 3B is the lens device 1 for a camera to be mounted onto the camera main body 20, and it is optically and physically coupled to the camera main body 20 by the CS mount 18.

Figure 4A:
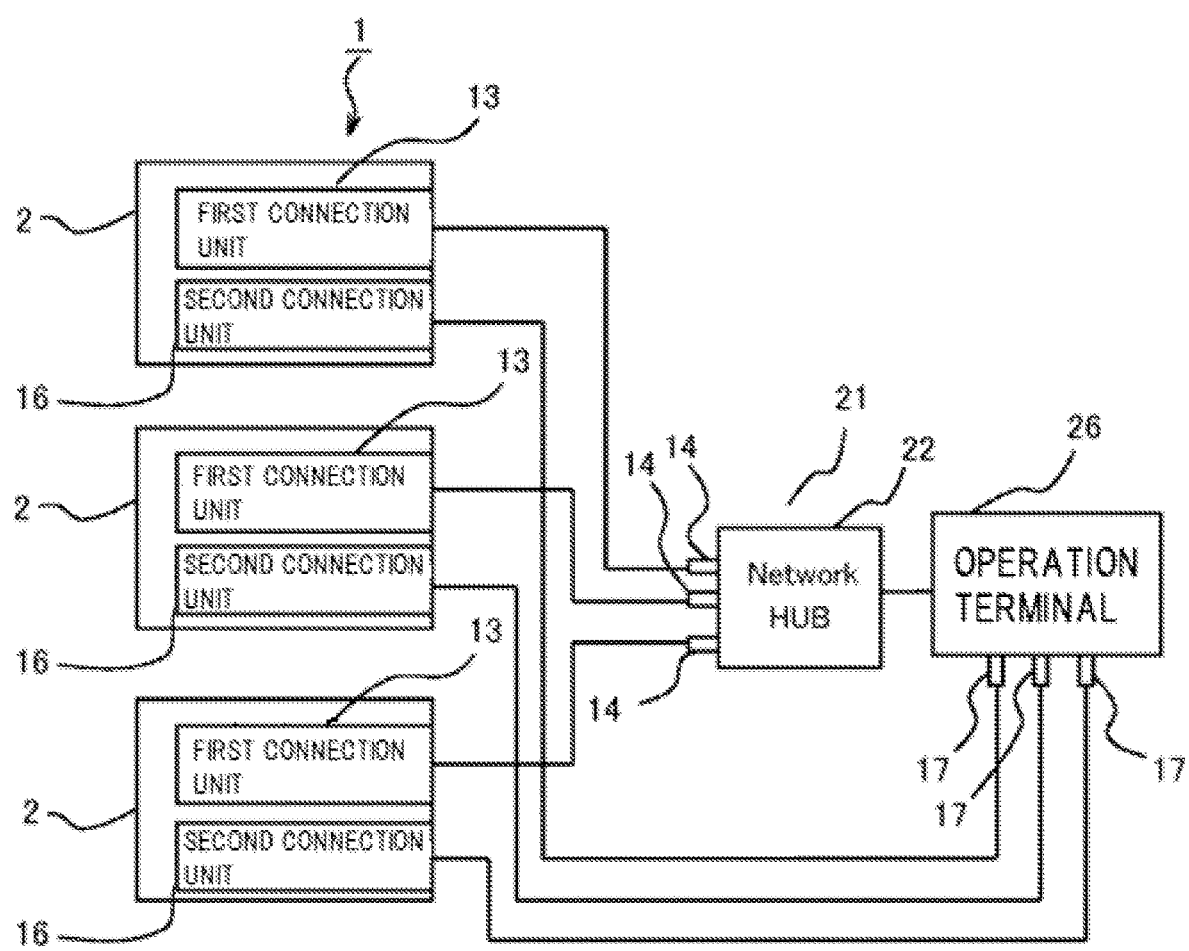
FIG. 4A illustrates a configuration in which the second connection units of the lens devices and the operation terminal are directly connected.
Figure 4B:
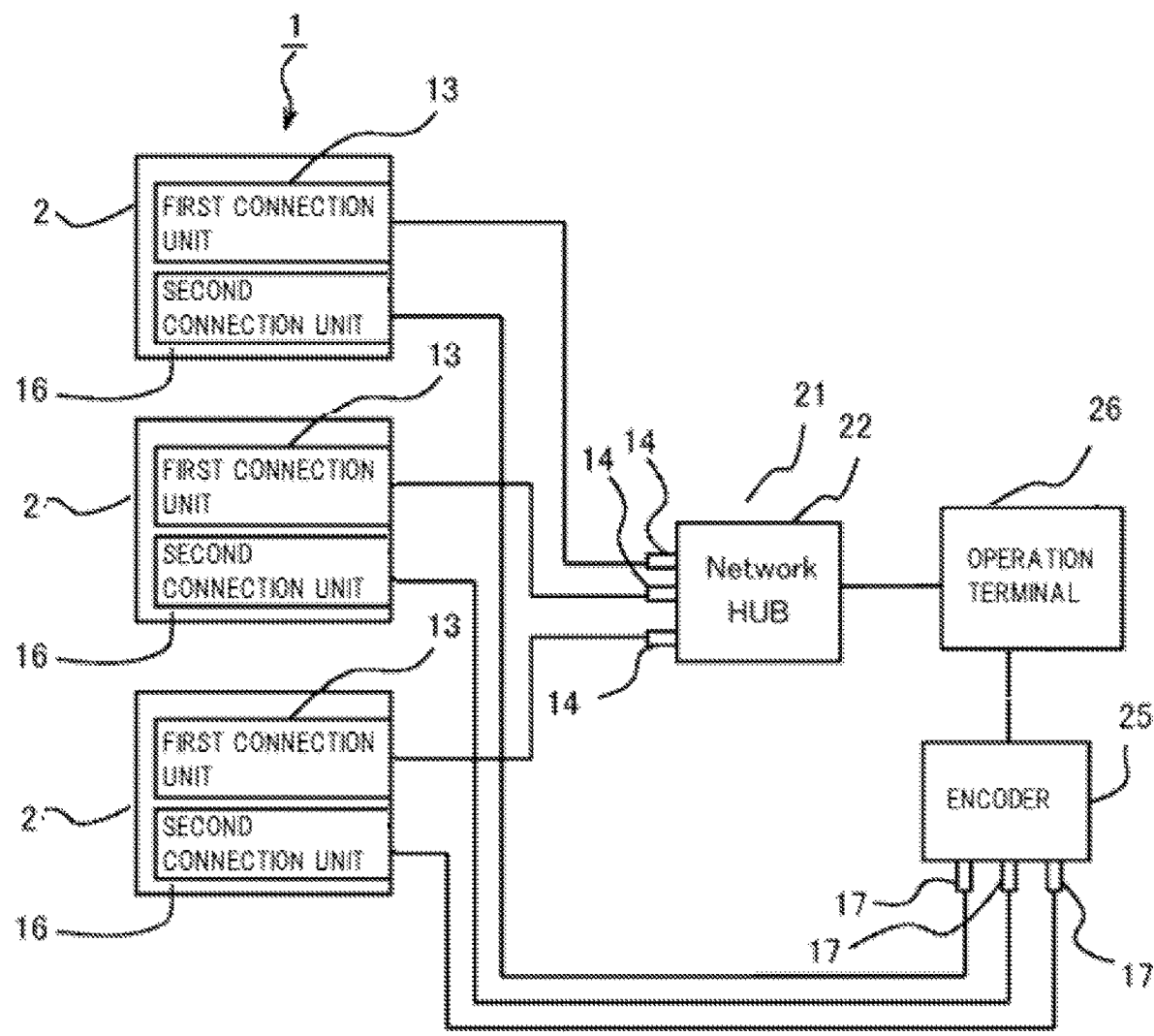
FIG. 4B illustrates a configuration in which the second connection units of the lens devices and the operation terminal are connected via an encoder.

Next, the configuration of the network 21 that connects the lens device 1 and the operation terminal 26 will be described by referring to FIG. 4. FIG. 4A illustrates an n-to-one mode of the lens devices 1 and the operation terminal 26, in which the first connection units 13 of the lens devices 1 are connected via the network 21 and the second connection units 16 are directly connected to the operation terminal 26. FIG. 4B illustrates an n-to-one mode of the lens devices 1 and the operation terminal 26, in which the first connection units 13 of the lens main bodies 2 are connected via the network 21 and the second connection units 16 are directly connected to the operation terminal 26 via an encoder 25.

FIG. 4A illustrates the configuration in which a plurality of lens devices 1 are aggregated via the network 21 and connected to a single operation terminal 26, which is a three-to-one connection mode where three lens device 1 are connected to a single operation terminal 26. As illustrated in FIG. 4A, the USB connectors 14 led out from the first connection units 13 of the three lens main bodies 2 are connected to a network hub 22 that configures the network 21, thereby building a three-to-one network 21. Note that the network hub 22 is a type that can feed the power to the lens devices 1 from the USB connectors 14. Furthermore, as illustrated in FIG. 4A, the three lens devices 1 are directly connected to the operation terminal 26 from the output signal connectors 17 of the second connection units 16 without going through the network 21.

With the network 21 illustrated in FIG. 4A, it is possible to collectively drive-control n-pieces of lens devices 1 by a single operation terminal 26.

Furthermore, as illustrated in FIG. 4B, the output signal connectors 17 of the second connection units 16 in the three lens devices 1 are connected to the encoder 25, and the output of the encoder 25 is connected to the operation terminal 26. The signals from the second connection units 16 are to go through the encoder 25, so that when sixteen lens main bodies 2 are connected to the network 21, for example, sixteen signals from the second connection units 16 of the lens main bodies 2 are converted to four (4 bit) signals by the encoder 25, and the converted signals are output to the operation terminal 26. This makes it possible to reduce the number of connection lines between the lens main bodies 2 and the operation terminal 26.

Figure 5:
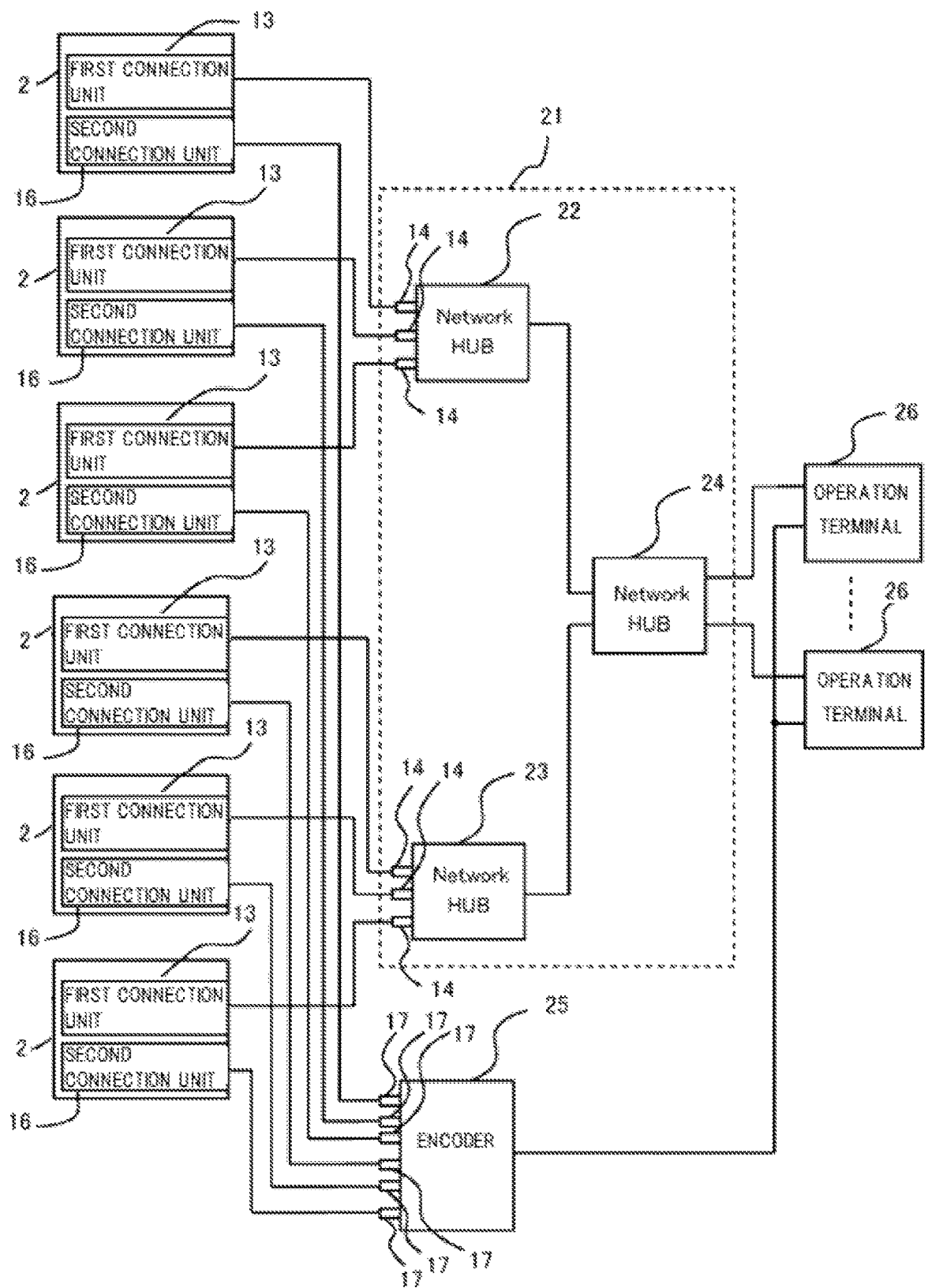
FIG. 5 is a block diagram illustrating an example of a network where the lens devices and the operation terminals according to the embodiment of the present invention are in an n-to-n connection mode, in which the second connection units of the lens devices and the operation terminals are connected via the encoder.

FIG. 5 is a block diagram illustrating an example of the network 21 where the lens devices 1 and the operation terminals 26 according to the embodiment of the present invention are in an n-to-n connection mode, which is a diagram illustrating a configuration where the second connection units 16 of the lens devices 1 and the operation terminals 26 are connected via the encoder 25.

As illustrated in FIG. 5, the n-to-n network 21 is built between the n-pieces of lens devices 1 and the n-pieces of operation terminals 26 by connecting each of the first connection units 13 of the three lens devices 1 to the network hubs 22, 23 configuring the network 21 in parallel, connecting the two network hubs 22, 23 in parallel to a network hub 24 that configures the network 21, and connecting the n-pieces of operation terminals 26 to the network hub 24.

Furthermore, in the embodiment illustrated in FIG. 5, each of the output signals from the second connection units 16 of the six lens devices 1 is directly input to a plurality of operation terminals 26 via the encoder 25.

As illustrated in FIG. 5, the USB connectors 14 or the Ethernet connectors 15 (shown in FIG. 3) as the input/output terminals of the first connection units 13 are led out from the control units 9 of the lens devices 1, and the USB or Ethernet connectors are connected to the network 21 to be connected to the central processing units 27 of the operation terminals 26 via the network 21.

Furthermore, the output signal connectors 17 are led out from the second connection units 16 of the lens devices 1, and connected to the central processing units 27 (shown in FIG. 1) of each of the operation terminals 26 directly.

As described above, by providing the second connection unit 16 in the lens device 1 and directly connecting the second connection unit 16 to the operation terminal 26, the lens action completion signal of the lens device 1 is directly input to the operation terminal 26 without going through the network 21. This makes it possible to grasp the action of the lens mechanisms in real time.

Thereby, communication between the lens device 1 and the operation terminal 26 is performed via a multi-purpose interface that is the first communication unit 13 with a communication mode (protocol) where the lens device 1 responds to a signal from the operation terminal 26, so that it is possible to connect a large number of lens devices 1 to the network and control those by the operation terminal 26.

With the network 21 illustrated in FIG. 5, it is possible to form a control system that drive-controls the n-pieces of lens devices 1 by a single operation terminal 26 among the n-pieces of operation terminals, or to form a control system that drive-controls a single lens device 1 by a corresponding single operation terminal 26 by allocating the n-pieces of operation terminals 26 to the n-pieces of lens devices 1, respectively.

As described, it is possible to control the lens main body 2 independently from the camera main body 20 according to a moving action command from the operation terminal 26 via the first communication interface 13*b* as a multi-purpose communication interface.

Furthermore, the second connection unit 16 that outputs a real-time trigger signal not dependent on the multi-purpose interface is also provided separately from the multi-purpose communication interface, so that, by outputting the information from the lens requiring a real-time property using a separate signal, the operation terminal 26 does not need to make an inquiry about the action state of the lens of the lens device 1 like the conventional communication mode (protocol). Therefore, it is possible to perform another processing during a period of waiting for a response indicating completion of the lens action. This makes it possible to lighten the load on the host side that is the operation terminal 26.

Regarding the lens action signal, described by referring to timing charts hereinafter are: a checking operation of the action state (status) of the drive motor in the lens device 1 performed by the operation terminal (host) side using the multi-purpose communication interface; and a checking operation of the action state (status) of the drive motor in the lens device 1 performed by the operation terminal (host) side according to the present invention designed to include, separately from the multi-purpose communication interface, the second connection unit 16 that outputs a trigger signal as the real-time output signal not dependent on the multi-purpose communication interface.

Figure 6A:
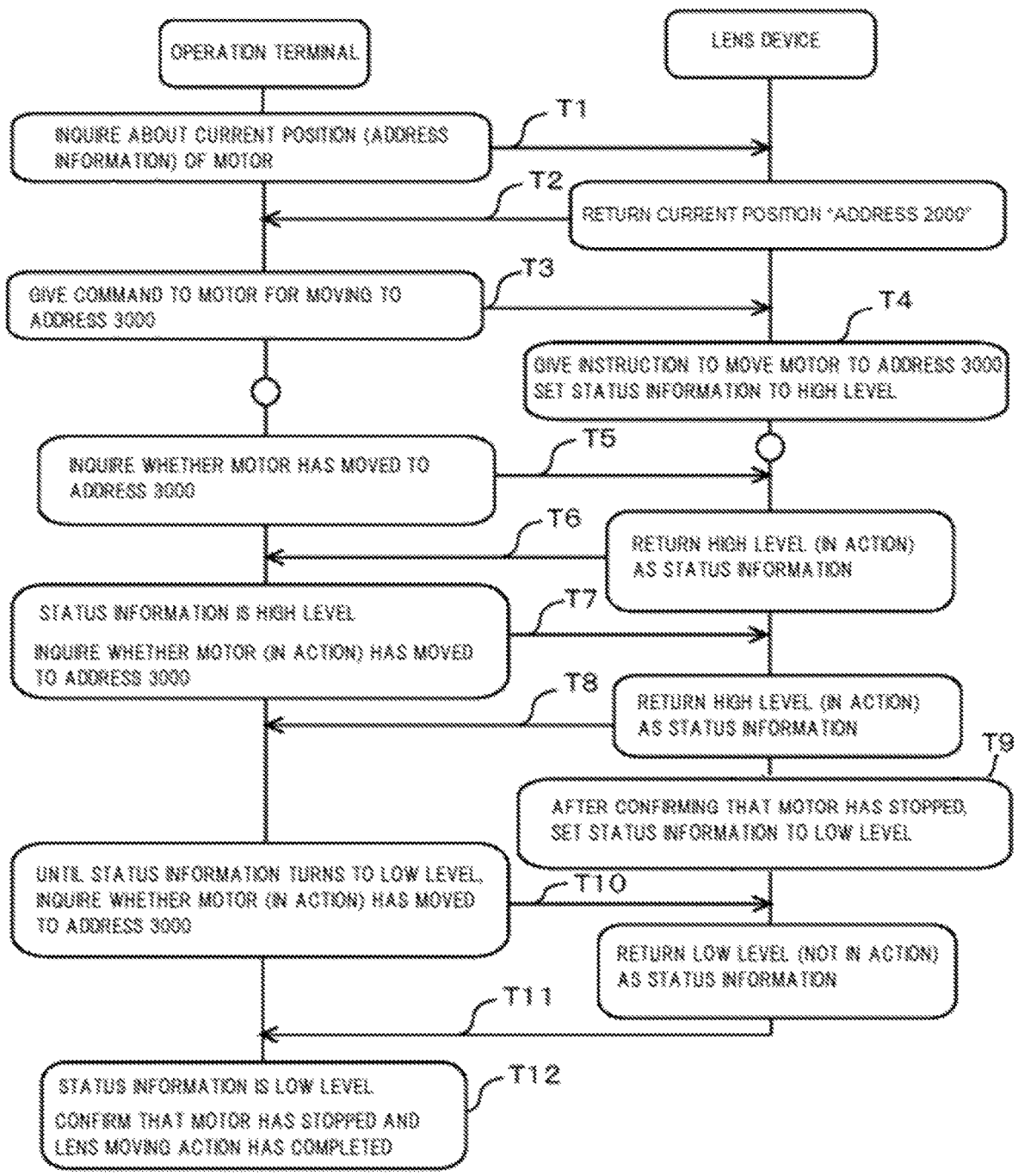
FIG. 6A is a timing chart of a case where a checking operation of an action state (status) of a drive motor on the operation terminal (host) side in the lens device is performed by using a first communication interface.
Figure 6B:
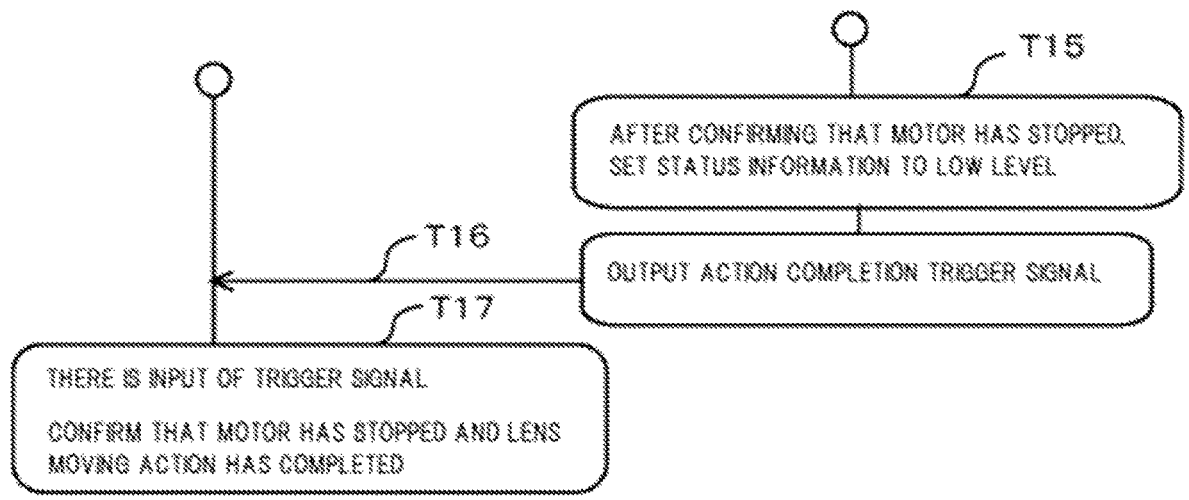
FIG. 6B is a timing chart of a case where a checking operation of an action state (status) of a drive motor on the operation terminal (host) side in the lens device is performed by using a second communication interface.

FIG. 6A is the timing chart when the checking operation of the action state (status) of the drive motor in the lens device 1 by the operation terminal (host) side is performed by using the first communication interface 13*b*, and FIG. 6B is the timing chart when the checking operation of the action state (status) of the drive motor in the lens device 1 by the operation terminal (host) side according to the present invention is performed by using the second communication interface 16*a*.

In the description below, the operation terminal 26 and the lens device 1 to be controlled are connected via the network 21, and it is assumed to move the zoom drive motor 3*c* from address 2000 as the current value (address information) to address 3000, for example.

As in FIG. 6A, the operation terminal 26 makes an inquiry to the lens device 1 about the current value (address information) of the zoom drive motor 3*c* (timing T1). The lens device 1 responds to the operation terminal 26 indicating that the current value (address information) of the zoom drive motor 3*c* is address 2000 (timing T2). Then, the operation terminal 26 issues a command to the lens device 1 to move to address 3000 such that the position of the zoom drive motor 3*c* comes to address 3000 (timing T3). After receiving the command, the lens device 1 controls the zoom drive motor 3*c* to move from address 2000 to address 3000. Furthermore, the lens device 1 sets the bit of the status information of the zoom drive motor 3*c* from 0 (low level) that is the information when not in action to 1 (high level) that is the information when in action (timing T4).

The operation terminal 26 makes an inquiry to the lens device 1 whether the zoom drive motor 3*c* of the lens device 1 has moved to address 3000 (timing T5). The lens device 1 outputs 1 (high level) as the status information of the zoom drive motor 3*c* (timing T6). When the received status information of the zoom drive motor 3*c* of the lens device 1 is 1 (high level), the operation terminal 26 makes an inquiry to the lens device 1 until the status information of the zoom drive motor 3*c* turns to 0 (low level) (timing T7). The lens device 1 outputs 1 (high level) as the status information since the zoom drive motor 3*c* is in action (timing T8). After the zoom drive motor 3*c* moves and stops at address 3000, the lens device 1 sets the status information to 0 (low level) (timing T9). For the inquiry from the operation terminal 26 thereafter (timing T10), the status information of 0 (low level) is output from the lens device 1 (timing T11), so that the operation terminal 26 can confirm that the zoom drive motor 3*c* has moved and stopped at address 3000 and that the lens moving action has completed (timing T12).

Therefore, for the checking operation of the action state (status) of the drive motor in the lens device 1 performed by the operation terminal (host) 26 side using the first communication interface 13*b* as the multi-purpose communication interface, during a period from the start of the moving action command of the drive motor until completion of the moving action of the drive motor, it is required to do checking at three timings of T5, T7, and T10 indicated in FIG. 6A, for example. Therefore, the operation terminal 26 is taken up by the processing of checking the completion of the moving action of the drive motor. This results in deteriorating the processing efficiency of the operation terminal 26.

The lens device 1 according to the present invention has the second connection unit including, separately from the multi-purpose communication interface, the second communication interface 16*a* that outputs the real-time trigger signal not dependent on the multi-purpose communication interface, and the processing of timing T5 and thereafter indicated in FIG. 6A is different. Therefore, the processing shifts to circles indicated in FIG. 6B from circles indicated in FIG. 6A. As in FIG. 6B, after the zoom drive motor 3*c* moves and stops at address 3000, the lens device 1 sets the status information to 0 (low level) (timing T15), and outputs a trigger signal (action completion signal) notifying action completion to the operation terminal 26 from the second connection unit 16 (timing T16). When the trigger signal is input from the lens device 1, an interrupt signal is notified to the CPU of the operation terminal 26, the zoom drive motor 3*c* moves and stops at address 3000, and the operation terminal 26 can confirm that the lens moving action is completed (timing T17).

As described above, in a case of the status checking operation using the first communication interface 13*b* illustrated in FIG. 1, frequent transmission processing for checking the state of the lens is necessary with the processing of T5 and thereafter indicated in FIG. 6A, and the state cannot be grasped in real time. Furthermore, unless the transmission processing is performed at appropriate timings, no response can be acquired from the lens side, so that it is not possible to grasp the state of the lens. Therefore, the present invention is designed to be able to communicate with the control unit 9 without going through the second communication interface 16*a*, that is, without going through the network 21, and to grasp the state of the lens in real time.

That is, by having the second connection unit including the second communication interface 16a that outputs a real-time trigger signal not dependent on the multi-purpose interface, there is only a single moving action command at one timing of T3 during the period from the start of a moving action command of the drive motor until completion of the moving action of the drive motor, such as from T3 to T12 indicated in FIG. 6A, for example. Therefore, the operation terminal 26 does not need to perform processing of checking completion of the moving action of the drive motor, so that it is not taken up by checking completion of the moving action of the drive motor. Therefore, the processing efficiency of the operation terminal 6 is not deteriorated. Furthermore, after the drive motor stops, the operation terminal 26 can immediately start the next processing.

As described above, the lens device 1 as illustrated in FIG. 1 is provided with the first connection unit 13 that forms the multi-purpose first communication interface 13b connected to the control unit 9. This makes it possible to perform control from the operation terminal 26 via the network 21, and a large number of lens main bodies 2 can be drive-controlled independently from the camera main bodies 20 according to the drive control signal from the operation terminal 26. Therefore, as illustrated in FIG. 1, it is possible to drive-control two lens mechanisms in a synchronous manner and to selectively drive-control the lens mechanism among a plurality of lens mechanisms, for example, according to the drive control signal from the control unit 9.

Furthermore, as illustrated in FIG. 1, the lens main body 2 and the operation terminal 26 are directly connected by the second communication interface 16a of the second connection unit 16, so that an action completion signal from the control unit 9 notifying that the lens mechanism has reached the target position (address) can be output directly to the operation terminal 26 without going through the network 21.

This makes it possible to be used for an inspection device in which an image is captured by the camera device 19 upon the action completion signal of the lens device 1, and the captured image is processed to perform inspection.

Figure 7:
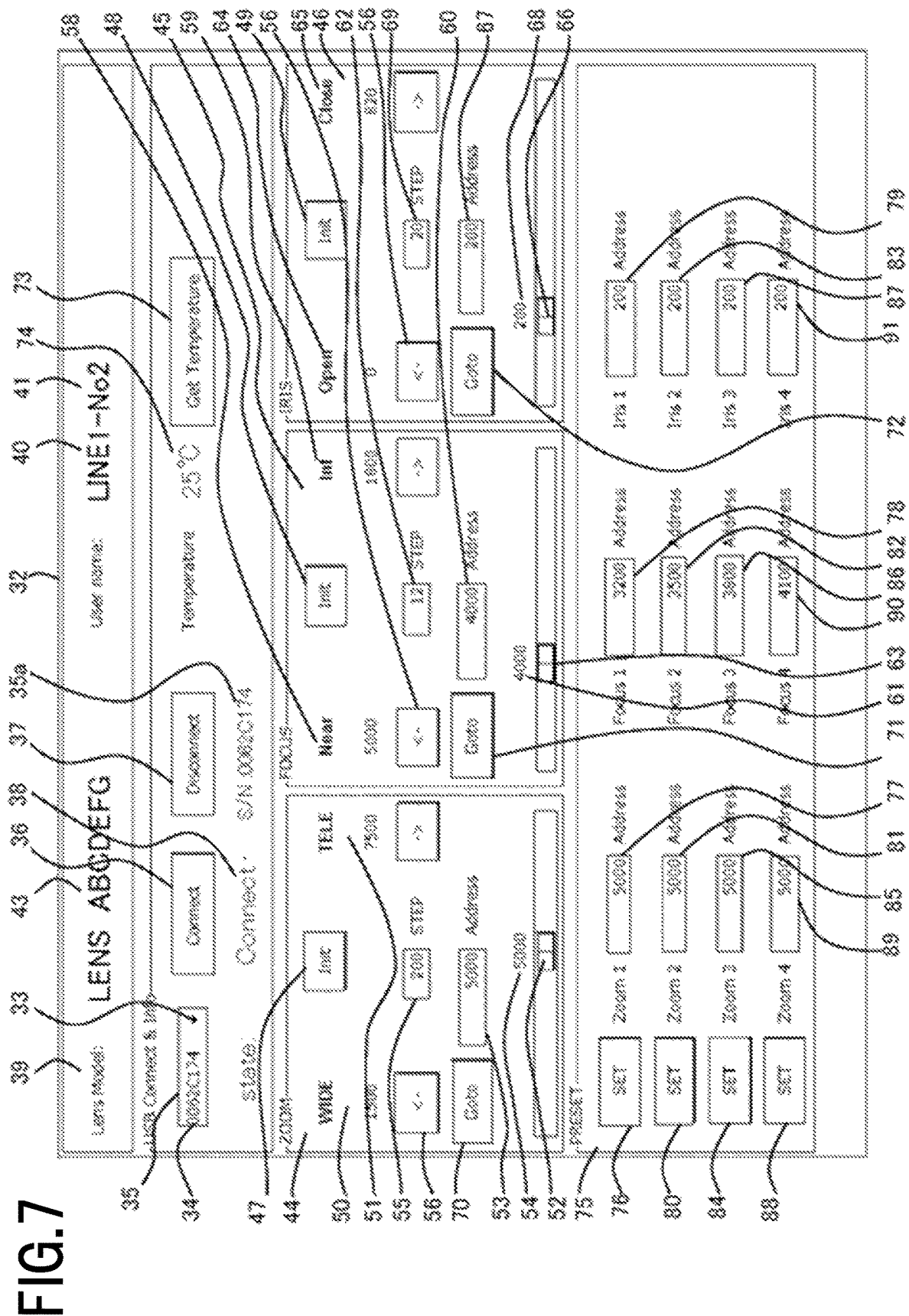
FIG. 7 is a diagram illustrating a display example of an operation screen of the operation terminal according to the embodiment of the present invention.

Next, a display example of the operation screen and operation buttons of the operation terminal 26 corresponding to the lens device 1 will be described by referring to FIG. 7. FIG. 7 is a diagram illustrating an display example of the operation screen of the operation terminal 26 according to the embodiment of the present invention.

The allocation unit 28 and the data unit 29 of the operation terminal 26 illustrated in FIG. 1 are displayed by the display unit 30 of the operation terminal 26, and control of the lens device 1 is performed by operations made on the displayed operation screen. As illustrated in FIG. 7, disposed on an operation screen 32 of the operation terminal 26 are: an operation button 33 for operating the allocation unit 28; and a display window 35 for displaying selection information of the lens device 1 that is selected by the operation button 33 and individually authenticated by the allocation unit 28. Furthermore, on the operation screen 32 of the operation terminal 26, displayed are: a connection button 36 that connects the lens device 1 on the network 21 recognized by the allocation unit 28 to the operation terminal 26 via an OS (Operating System); a disconnection button 37 that cuts off the lens device 1 connected by the connection button 36 from the operation terminal 26; a display window 38 that displays the action states of the connection button 26 and the disconnection button 37; and a display window 35a that displays the selection information of the lens device 1.

As illustrated in FIG. 7, onto the operation screen 32 of the operation terminal 26, a temperature measurement start button 73, which acquires temperature information from the temperature detection unit 12 received at the central processing unit 27, is embedded. The ambient temperature information of the lens main body 2 is acquired by operating the temperature measurement start button 73, and the acquired temperature is displayed as ambient temperature 74.

Furthermore, as illustrated in FIG. 7, in addition to selection information 34 of the lens device 1, the identification information for identifying the lens device 1 contains: a lens model 39 such as a zoom lens, a varifocal lens, or a fixed focal lens; information of line 40 to which a plurality of lens main bodies 2 are connected; positional information 41 indicating individual lens body 2 in the line 40; and the like.

As described above, the allocation unit 28 recognizes each of the lens main bodies 2 based on the identification information and characteristic information for identifying the lens main body 2, and the allocation unit 28 displays the selection information (identification information) 34 of the recognized lens main body 2 in the display window 35, displays the lens model (characteristic information) 39 in a lens model display window 43, and displays the information (identification information) of the line 40 and the positional information (characteristic information) 41 in a corresponding manner. In FIG. 7, the line to which a plurality of lens main bodies 2 are connected is determined based on the information of the line 40, and what number the lens main body 2 is in the line 40 is displayed based on the positional information 41. It is to be noted that the display is not limited to such examples.

Furthermore, onto the operation screen 32 of the operation terminal 26, the data unit 29 that outputs respective drive control signals to the zoom drive control unit 6, the focus drive control unit 7, and the iris drive control unit 8 as the drive control units of the lens main body 2 is embedded. That is, as the data unit 29 illustrated in FIG. 1, provided are: a zoom data unit 44 that outputs a drive control signal for drive-controlling the zoom adjustment lens mechanism 3; a focus data unit 45 that outputs a drive control signal for driving-controlling the focus adjustment lens mechanism 4; and an iris data unit 46 that outputs a drive control signal for driving-controlling the iris adjustment unit mechanism 5. Note that an optical filter data unit that outputs a drive control signal to the optical filter adjustment lens mechanism and an extender data unit that outputs a drive control signal to the extender adjustment lens mechanism may be added on the operation screen as necessary.

Furthermore, as illustrated in FIG. 7, onto the operation screen 32 of the operation terminal 26, initialization buttons 47, 48, and 49 for initializing the respective lens mechanisms are embedded in the zoom data unit 44, the focus data unit 45, and the iris data unit 46.

The drive motors controlled by the zoom data unit 44, the focus data unit 45, and the iris data unit 46 on the operation screen 32 of the operation terminal 26 illustrated in FIG. 7 are stepping motors. The zoom data unit 44 is configured to display the characteristic information of a wide focal length address 50 on a wide angle side and the characteristic information of a telephoto focal length address 51 on the telephoto side among the focal lengths of the lens main body 2 based on the characteristic information of the lens main body 2 recognized by the allocation unit 28, and to display focal length address information 53, 54 varied by sliding a zoom slide bar 52 within the range of the wide angle focal length address 50 and the telephoto focal length address 51. Furthermore, the zoom data unit 44 is configured to display step number information 55 for performing fine adjustment of the focus by operating a step operation button 56 from the position of the focal length address information 53. It is set such that the step number decreases when the step operation button 56 on the left side is operated, and the step number increases when the step operation button 56 on the right side is operated.

FIG. 7 illustrates a case where the focal length address information 54 is changed to the position of "5000" by the zoom slide bar 52. When the zoom slide bar 52 is slid to the position of the focal length address "5000", the numeral "5000" is displayed as the focal length address information 53, 54.

In the example illustrated in FIG. 7, it is assumed that the varifocal lens is used as the lens of the lens device 1. Thus, the lens becomes out of focus when zoomed in by the zoom adjustment lens mechanism 3, so that it is necessary to correct the focus position again. The focus data unit 45 is configured to display characteristic information of near point and far point focus addresses 58, 59 corresponding to the focal length (characteristic information) zoomed by the zoom adjustment lens mechanism 3, and to display focus address information 60, 61 indicating the focus position by sliding a focus slide bar 63 within the range of the focus addresses 58, 59. Furthermore, the focus data unit 45 displays step number information 62 for performing fine adjustment of the focus.

In the example illustrated in FIG. 7, it is possible to adjust the iris when it is desired to adjust the brightness of the image by changing the light quantity passing through the lens. The iris data unit 46 performing adjustment of the iris is configured to display the characteristic information of iris addresses 64, 65 of the maximum aperture number (fully opened) and the minimum aperture number (fully closed) in iris adjustment, and to display iris address information 67, 68 indicating the open/close positions of the aperture by sliding an iris slide bar 66 within the range of the iris addresses 64, 65. Furthermore, the iris data unit 46 displays step number information 69 for performing fine adjustment of the open/close positions of the aperture. While the zoom focal length, the focus position, and the open/close level of the iris are displayed as the address information, it is not intended to be limited thereto. Instead of the address information, the focal length and F-number may be displayed as well.

Onto the operation screen 32 of the operation terminal 26 illustrated in FIG. 7, execution buttons 70, 71, and 72 for operating the lens mechanisms by outputting drive control signals based on the data of the zoom data unit 44, the focus data unit 45, and the iris data unit 46 are embedded. When the execution buttons 71, 72, and 73 are operated, the zoom data unit 44, the focus data unit 45, and the iris data unit 46 output the data to the zoom drive control unit 6, the focus drive control unit 7, and the iris drive control unit 8 of the lens device 1 by corresponding to the focal length address information 53 as the zoom address (for example, position of "5000"), the focus address information 60 as the focus address (for example, position of "4000"), and the iris address information 67 as the iris address (for example, position of "2000") so as to drive-control the zoom drive motor 3c of the zoom adjustment lens mechanism 3, the focus drive motor 4c of the focus lens mechanism 4, and the iris drive motor 5c of the iris adjustment unit mechanism 5.

Furthermore, the operation screen 32 of the operation terminal 26 includes a preset unit 75 where the focal length address information 53, 54, the focus address information 60, 61, and the iris address information 67, 69 as the address information of the zoom adjustment lens mechanism 3, the focus lens mechanism 4, the iris adjustment unit mechanism 5 set by the zoom data unit 44, the focus data unit 45, and the iris data unit 46 can be registered in advance. When a set button 1 (76) located on the uppermost section on the preset unit 75 is pressed, the value (numeric value) of the focal length address information 53 is registered in a zoom setting address 1 (77) of Zoom 1. At the same time, the value of the focus address information 60 is registered in a focus setting address 1 (78) of Focus 1, and the value of the iris address information 67 is registered in an iris setting address 1 (79) of Iris 1.

Similarly, by setting the address information in the focal length address information 53 of the zoom data unit 44, the focus address information 60 of the focus data unit 45, and the iris address information 67 of the iris data unit 46 and then pressing a set button 2 (80) located on the next section of the uppermost section, the value of the focal length address information 53 is registered in a zoom setting address 2 (81) of Zoom 2. At the same time, the value of the focus address information 60 is registered in a focus setting address 2 (82) of Focus 2, and the value of the iris address information 67 is registered in an iris setting address 2 (83) of Iris 2.

Similarly, by setting the address information in the focal length address information 53 of the zoom data unit 44, the focus address information 60 of the focus data unit 45, and the iris address information 67 of the iris data unit 46 and then pressing a set button 3 (84), the value of the focal length address information 53 is registered in a zoom setting address 3 (85) of Zoom 3. At the same time, the value of the focus address information 60 is registered in a focus setting address 3 (86) of Focus 3, and the value of the iris address information 67 is registered in an iris setting address 3 (87) of Iris 3.

Furthermore, by setting the address information in the focal length address information 53 of the zoom data unit 44, the focus address information 60 of the focus data unit 45, and the iris address information 67 of the iris data unit 46 and then pressing a set button 4 (88), the value of the focal length address information 53 is registered in a zoom setting address 4 (89) of Zoom 4. At the same time, the value of the focus address information 60 is registered in a focus setting address 4 (90) of Focus 4, and the value of the iris address information 67 is registered in an iris setting address 4 (91) of Iris 4.

As described above, in the preset unit 75, the respective numeric values of the focal length address information 53 set by the zoom data unit 44, for example, which correspond to the zoom setting address 1 (77) of Zoom 1 to the zoom setting address 4 (89) of Zoom 4, are registered by pressing the set buttons 1 to 4. In the display example, there are four pieces of focal length address information that can be registered. However, the number thereof is not limited thereto.

In the preset unit 75, the operation terminal 26 registers the address information of the zoom data unit 44, the focus data unit 45, and the iris data unit 46 by associating with the data with each of inspection steps of the inspection device and moving positions (address information) of the lens mechanisms in the inspection steps, for example. This makes it possible to easily set the moving positions of each of the lens mechanisms of the inspection device for each of the inspection steps by designating the number of set buttons (set numbers) from 1 to 4 registered in the preset unit 75 and reading out the set address information from the set numbers.

Next, setting of the lens device 1 performed by the operation terminal 26 will be described by referring to a flowchart indicated in FIG. 8. The lens device 1 is mounted to the camera main body 20, and an embodiment of the lens device 1 applied to an inspection device that performs inspections by processing the images from the camera main body 20 will be described. It is assumed that a plurality of lens devices 1 are connected to a single operation terminal 26 via the network 21.

Figure 8:
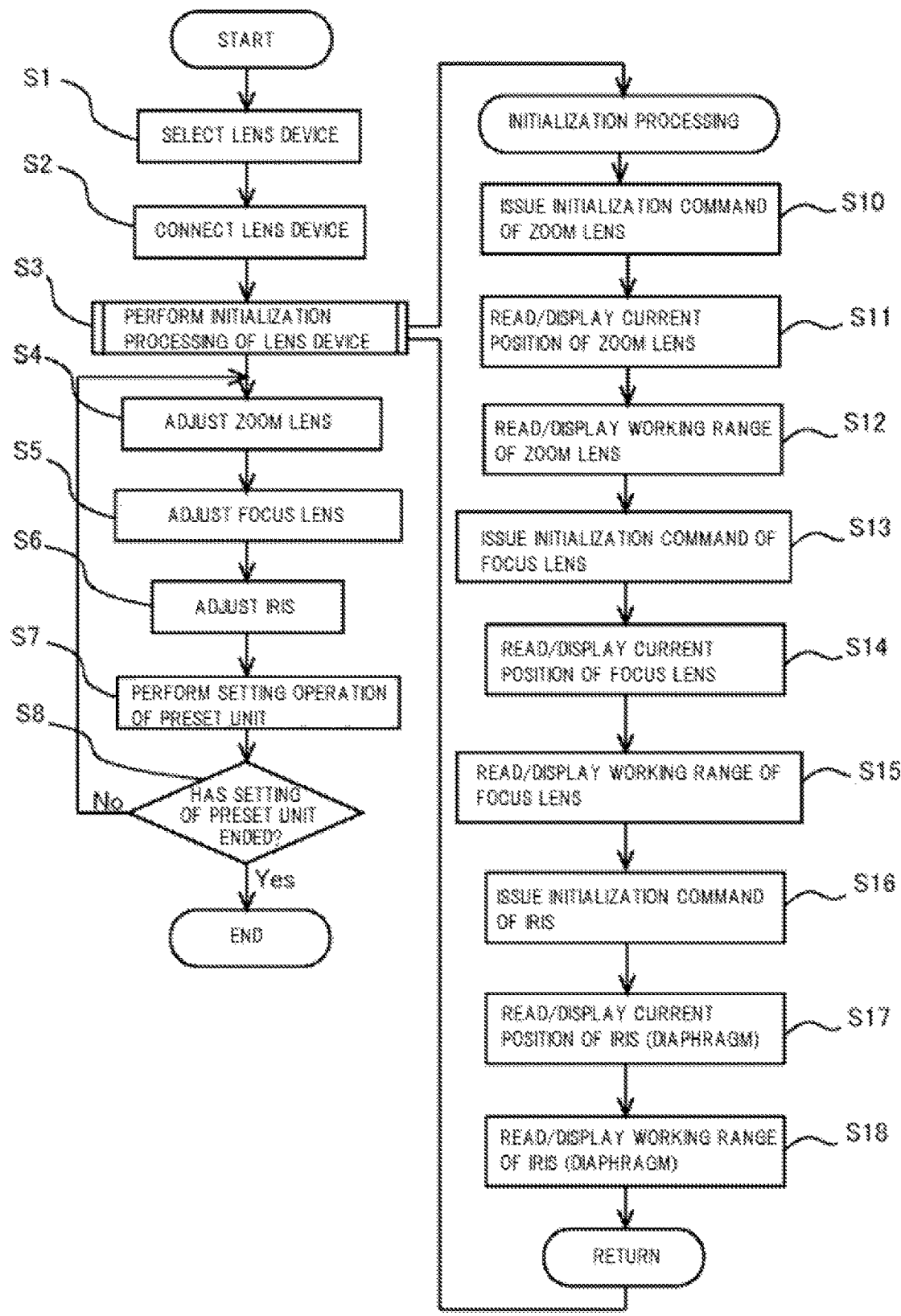
FIG. 8 is a flowchart for describing a series of actions of a lens mechanism according to the embodiment of the present invention.

As in FIG. 8, first, the operation terminal 26 makes selection of the lens device 1 (Step S1 of FIG. 8). For selection of the lens main body 2, the operation button 33 on the operation screen of the operation terminal 26 illustrated in FIG. 7 is operated to select a single lens main body (device) 1 from the lens devices 1 connected to the network. The body number of the selected lens device 1 is displayed in the display window 35 of the selection information 34 illustrated in FIG. 7. Then, by operating the connection button 36 illustrated in FIG. 7, the lens device 1 corresponding to the selected selection information 34 is connected to the operation terminal 26 by software via the OS (Step S2 of FIG. 8), and the body number connected thereby is displayed in the display window 35. Furthermore, the line number and the connected order 41 on the line 40 of the selected lens device 1 are displayed. Thereby, only the selected lens device 1 becomes the operation target of the operation terminal 26. The other lens devices 1 simply exist on the network 21, which are not connected to the operation terminal 26 and not the operation target of the operation terminal 26.

Furthermore, when switching the lens device 1 on the network 21 on the line 40, the disconnection button 37 is operated to cut off the lens device 1 corresponding to the selection information 34 from the operation terminal 26 by software via the OS and, after cutting it off, another lens device 1 is selected.

When the lens device 1 is connected to the operation terminal 26 by software, the characteristic information indicating the specifications of the lens mechanisms and the identification information for identifying the lens device 1 are output from the lens information output unit 10 of the lens device 1 illustrated in FIG. 1 via the network 21. The allocation unit 28 of the operation terminal 26 recognizes the lens device 1 based on the characteristic information and the identification information output from the information output unit 10 illustrated in FIG. 1, displays the lens model 39 of the lens device 1 in the lens model display window 43, and the information of the line 40 and the information of the order 41 are displayed on the operation screen 32 in a corresponding manner.

In the example illustrated in FIG. 7, the lens device 1 having "0062C174" as the selection information 34 thereof is selected from the line 40, that is, from the network 21, and it is displayed on the operation screen 32 that the lens model 39 thereof is "LENS ABCDEFG" and that the selected lens device 1 corresponds to "No. 2" as the order 41 on the line 40 (the network 21). Thereby, the operator can grasp the connection state of the lens device 1. Furthermore, when the ambient temperature information of the lens main body 2 is required, the ambient temperature of the lens main body 2 measured by the temperature sensor 11 and the temperature detection unit 12 of the lens main body 2 is displayed by pressing the temperature measurement start button 37.

At the point where the processing of lens selection (Step S1) and lens connection (Step S2) indicated in FIG. 8 ends, initialization of the lens device is performed (Step S3 of FIG. 8) by operating the operation screen 32, and the initialization buttons 47, 48, 49 illustrated in FIG. 7. Hereinafter, initialization processing of the zoom adjustment lens mechanism 3, the focus adjustment lens mechanism 4, and the iris adjustment unit mechanism 5 of the lens device 1 will be described.

When the operator operates the zoom initialization button 47 on the operation screen 32 of the operation terminal 26 illustrated in FIG. 7, a command for initializing the zoom adjustment lens mechanism 3 is issued for the zoom drive control unit 6 allocated by the allocation unit 28 (Step S10 of FIG. 8), the current value of the zoom adjustment lens mechanism 3 is read according to the command, and the read current value of the zoom adjustment lens mechanism 3 is displayed in the focal length address information 53, 54 on the operation screen 32 (Step S11 of FIG. 8). Furthermore, the information (characteristic information) indicating the working ranges on WIDE side and TELE side of the zoom adjustment lens mechanism 3 is read, and the read working ranges are displayed in the wide focal length address 50 and the telephoto focal length address 51 indicating the working ranges of the zoom adjustment lens mechanism 3 (Step S12 of FIG. 8).

When a series of processing related to initialization of the zoom adjustment lens mechanism 3 ends, a series of initialization processing related to the focus adjustment lens mechanism 4 is started. When the operator operates the focus initialization button 48 on the operation screen 32 of the operation terminal 26 illustrated in FIG. 7, a command for initializing the focus adjustment lens mechanism 4 is issued for the focus drive control unit 7 allocated by the allocation unit 28 (Step S13 of FIG. 8), the current value of the focus adjustment lens mechanism 4 is read according to the command, and the read current value of the focus adjustment lens mechanism 4 is displayed in the focus address information 60, 61 on the operation screen 32 of the operation terminal 26 (Step S14 of FIG. 8). Furthermore, the information (characteristic information) indicating the working ranges on Near side and Inf side of the focus adjustment lens mechanism 4 is read, and the read working ranges are displayed in the focus addresses 58, 59 that indicate the working ranges of the focus adjustment lens mechanism 4 (Step S15 of FIG. 8).

When a series of processing related to initialization of the focus adjustment lens mechanism 4 ends, a series of initialization processing related to the iris adjustment unit mechanism 5 is started. When the operator operates the iris initialization button 49 on the operation screen 32 of the operation terminal 26 illustrated in FIG. 7, a command for initializing the iris adjustment unit mechanism 5 is issued for the iris drive control unit 8 allocated by the allocation unit 28 (Step S16 of FIG. 8), the current value of the iris adjustment unit mechanism 5 is read according to the command, and the read current value of the iris adjustment unit mechanism 5 is displayed in the iris address information 67, 68 on the operation screen 32 of the operation terminal 26 (Step S17 of FIG. 8). Furthermore, the information (characteristic information) indicating the working ranges on Open side and Close side of the iris adjustment unit mechanism 5 is read, and the read working ranges are displayed in the iris addresses 64, 65 that indicate the working ranges of the iris adjustment unit mechanism 5 (Step S18 of FIG. 8).

At the point where a series of processing related to initialization of the iris adjustment unit mechanism 5 ends, initialization processing of the optical filter adjustment lens mechanism and initialization processing of the extender adjustment lens mechanism are to be performed as necessary.

When the above-described series of initialization processing ends, the moving positions of the lens mechanisms are registered in advance while checking an optical image that is captured by the camera device 19 by drive-controlling each of the lens mechanisms. This is for registering in advance each of the inspection steps of the inspection device and the moving positions (address information) of the lens mechanisms in the inspection steps in an associated manner.

First, adjustment of the zoom adjustment lens mechanism is performed (Step S4 indicated in FIG. 8). Adjustment of the zoom adjustment lens mechanism is performed by an operation of the step operation button 56 an operation of the zoom slide bar 52, or an operation of the execution button (Goto button) 70 of the zoom data unit 44. By those operations, the operation terminal 26 outputs the command for drive-controlling the zoom drive motor 3c of the zoom adjustment lens mechanism 3 of the lens device 1 to the zoom drive control unit 6 to drive-control the zoom drive motor 3c according to the command so as to execute zoom adjustment of the zoom adjustment lens mechanism 3.

Furthermore, the zoom data unit 44 reads the current zoom value of the zoom adjustment lens mechanism 3 after zoom adjustment of the zoom adjustment lens mechanism 3 ends, and displays the read zoom value on the operation screen 32 of the operation terminal 26 as the focal length address information 53, 54.

Then, adjustment of the focus adjustment lens mechanism is performed (Step S5 indicated in FIG. 8). Adjustment of the focus adjustment lens mechanism is performed by an operation of the step operation button 56, an operation of the focus slide bar 63, or an operation of the execution button (Goto button) 71 of the focus data unit 4. By those operations, the operation terminal 26 outputs the command for drive-controlling the focus drive motor 4c of the focus adjustment lens mechanism 4 of the lens device 1 to the focus drive control unit 7 to drive-control the focus drive motor 4c according to the command so as to execute focus adjustment of the focus adjustment lens mechanism 4.

Furthermore, the focus data unit 45 reads the current focus value of the focus adjustment lens mechanism 4 after zoom adjustment by the focus adjustment lens mechanism 4 ends, and displays the read focus value on the operation screen 32 of the operation terminal 26 as the focus address information 60, 61.

Furthermore, adjustment of the iris adjustment unit mechanism is performed (Step S6 indicated in FIG. 8). Adjustment of the iris adjustment unit mechanism is performed by an operation of the step operation button 56, an operation of the iris slide bar 66, or an operation of the execution button (Goto button) 72 of the iris data unit 46. By those operations, the operation terminal 26 outputs the command for drive-controlling the iris drive motor 5c of the iris adjustment unit mechanism 5 of the lens device 1 to the iris drive control unit 8 to drive-control the iris drive motor 5c according to the command so as to execute iris adjustment of the iris adjustment unit mechanism 5.

Furthermore, the iris data unit 46 reads the current iris value of the iris adjustment unit mechanism 5 after iris adjustment of the iris adjustment unit mechanism 5 ends, and displays the read iris value on the operation screen 32 of the operation terminal 26 as the iris address information 67, 68.

Then, after adjustment of the zoom adjustment lens mechanism 3, the focus adjustment lens mechanism 4, and the iris adjustment unit mechanism 5, the set button 1 (76) of the preset unit 75 is pressed. Thereby, the lens focal length address information 53 of the zoom adjustment lens mechanism 3 is displayed in the zoom setting address 1 (77), and registered as the data of Zoom 1. Furthermore, the lens focus address information 60 of the focus adjustment lens mechanism 4 is displayed in the focus setting address 1 (78), and registered as the data of Focus 1. Moreover, the unit iris address information 67 of the iris adjustment unit mechanism 5 is displayed in the iris setting address 1 (79), and registered as the data of Iris 1.

Then, it is checked whether set operations by the set buttons of the preset unit 75 are completed (Step S8 of FIG. 8). When the prescribed set operations are completed, adjustment of the lens mechanisms is ended. In the meantime, when registering operations by the set buttons are to be continued, the processing is shifted to Step S4.

As for the preset operations by the zoom adjustment lens mechanism 3, the focus adjustment lens mechanism 4, and the iris adjustment unit mechanism 5, registration of the setting address information is possible up to the set button 4 at the maximum. Note, however, that the maximum registration number of setting address is not limited to "4".

Through the operations described above, the setting address information (positional information) of the zoom adjustment lens mechanism, the focus adjustment lens mechanism, and the iris adjustment unit mechanism is registered.

Figure 9:
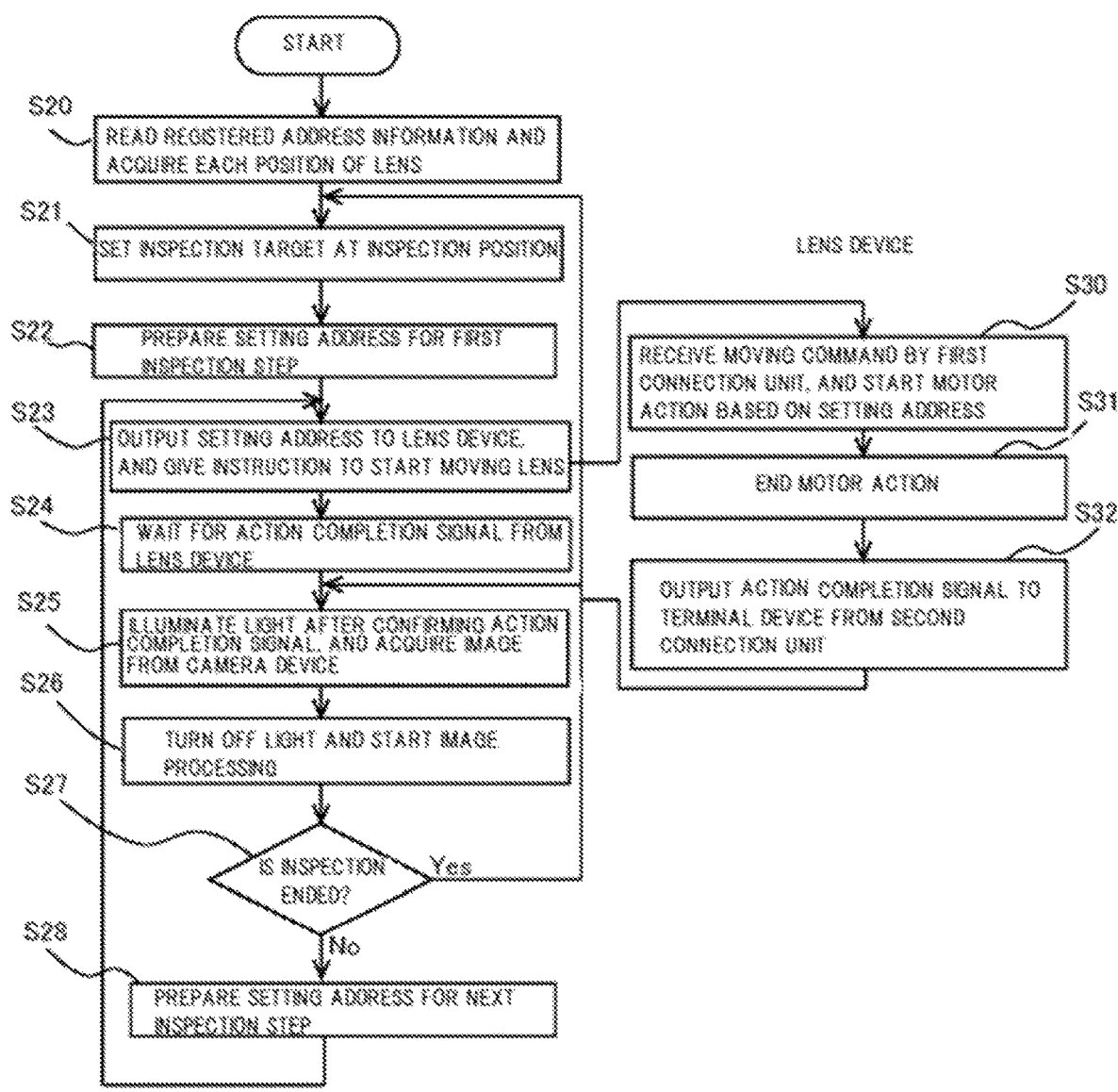
FIG. 9 is a flowchart for describing actions of the operation terminal and the lens device when the lens mechanism according to the embodiment of the present invention is used for an inspection device.

Next, the inspection device using the lens device 1 will be described by referring to FIG. 9. FIG. 9 is a flowchart for describing actions of the operation terminal 26 and the lens device 1, when the lens mechanisms according to the embodiment of the present invention are used for the inspection device. In the description below, control of the lens device 1 performed by the operation terminal 26 that controls the inspection device and actions of the lens device 1 will be described.

The inspection device is configured with: the camera device 19 that includes the lens device 1 for capturing an image of an inspection target; a lighting device that illuminates the inspection target when capturing an image by the camera device 19; an image processing device that performs an inspection by processing the image acquired by the camera device 19; and the operation terminal 26 that performs communication with and control of the lens device 1, the lighting device, and the image processing device. Furthermore, it is assumed that the lens device 1 and the operation terminal 26 are in a connection mode illustrated in FIG. 4A, for example. It is also assumed that the data of the zoom setting address of the zoom adjustment lens mechanism, the focus setting address of the focus adjustment lens mechanism, and the iris setting address of the iris adjustment unit mechanism of the lens device 1 is registered in advance in the operation terminal 26. Note that the description provided below is merely presented as an example, and not intended to set any limitation.

As in FIG. 9, first, the operation terminal of the inspection device acquires the data (positional information) of the pre-registered setting addresses of the zoom adjustment lens mechanism, the focus adjustment lens mechanism, and the iris adjustment unit mechanism in accordance with the inspection target in order of inspection steps (Step S20). The inspection target is set at an inspection position by a transportation device, a robot arm, or the like, for example (Step S21). The operation terminal 26 prepares the data (positional information) of the setting addresses of the zoom adjustment lens mechanism, the focus adjustment lens mechanism, and the iris adjustment unit mechanism used in the first inspection step (Step S22).

The data (positional information) of the setting addresses of the zoom adjustment lens mechanism, the focus adjustment lens mechanism, and the iris adjustment unit mechanism used in the inspection step is output to the lens device 1 via the network (Step S23). The lens device 1 receives moving commands and addresses of each of the lens mechanisms by the control unit 9 from the first connection unit 13, and the control unit 9 issues moving amounts of the drive motors and moving commands thereof to the respective drive control units so as to move the lens to a prescribed position (Step S30).

After outputting the setting address information (positional information) of each of the lens mechanisms, the operation terminal 26 checks whether the action completion signal from the lens device 1 output from the second connection unit 16 is input (Step S24). By using an interrupt function of the computer built into the operation terminal 26, for example, for checking whether there is input of the action completion signal, the operation terminal 26 can perform another processing during a period until there is input of the action completion signal.

The control unit 9 of the lens device 1 confirms that the actions of the drive motors driving respective lens mechanisms have ended and that the lens actions have stopped (Step S31) and, upon confirming that the actions of the drive motors have stopped, outputs the action completion signal to the operation terminal 26 from the second connection unit 16 (Step S32). After confirming that there is the action completion signal from the lens device 1, the operation terminal 26 illuminates the light of the lighting device and gives an instruction to the image processing device to import the image from the camera device 19 (Step S25).

Furthermore, the operation terminal 26 illuminates the light of the lighting device, and gives an instruction to the image processing device to inspect the inspection target by performing image processing (Step S26). The operation terminal 26 checks whether the inspection of the inspection target is ended (Step S27). When determined that the inspection is ended (Yes in Step S27), the operation terminal 26 gives an instruction to the transportation device to set a new inspection target at the inspection position, and shifts to Step S21.

In the meantime, when the inspection is not ended (No in Step S27), the operation terminal 26 prepares the data (positional information) of the setting address information of the zoom adjustment lens mechanism, the focus adjustment lens mechanism, and the iris adjustment unit mechanism used in the next inspection step (Step S28). Thereafter, the processing is shifted to step S23 to continue the inspection.

As described above, the operation terminal 26 can register in advance the focal length address information 53 of the zoom adjustment lens mechanism 3, the focus address information 60 of the focus lens mechanism 4, and the iris address information 67 of the iris adjustment unit mechanism 5 set by the zoom data unit 44, the focus data unit 45, and the iris data unit 46, so that it is possible to perform inspections efficiently by storing in advance each of the inspection steps of the inspection device in association with the registered address information.

As another embodiment, when the lens moving positions of the lens mechanisms are to be adjusted in the inspection step in accordance with the distance to the inspection target, the lens positions of the lens mechanisms of the lens device are registered in advance as the setting address information in accordance with the distance with respect to the inspection target.

In the inspection step, the registered setting address information corresponding to the moving positions of the lens mechanisms stored in advance is read out based on the information of the measured distance between the lens device and the inspection target, and a command for moving to the moving positions of the read-out address information is output to the lens device via the first communication interface of the network.

As described, in the image processing inspection, when the position of the inspection target is not fixed, for example, the optimal positional information of the lens mechanisms in accordance with the distance between the lens device and the inspection target is registered in advance as the setting address information, the distance to the inspection target is measured in the inspection step, and the address information corresponding to the measured distance is read out to set the lens positions of the lens mechanisms. This makes it possible to perform the inspection efficiently.

As described above, according to the present invention, it is possible to perform inspections at a high speed by capturing an image by the camera upon the start of driving the lens mechanisms, by providing the multi-purpose interface and, separately from the multi-purpose interface, the signal line for outputting the real-time trigger signal not dependent on the multi-purpose interface and by outputting, by a separate signal, the information requiring a real-time property from the lens device.

Furthermore, according to the present invention, it is possible to lighten the load on the host side that is the operation terminal until there is a response from the lens device, by providing the multi-purpose interface and, separately from the multi-purpose interface, the signal line for outputting the real-time trigger signal not dependent on the multi-purpose interface and by outputting, by a separate signal, the information requiring a real-time property from the lens device.

Moreover, according to the present invention, it is possible to expand the connection mode between the lens device and the operation terminal to the n-to-one or n-to-n connection mode by connecting the lens device and the operation terminal via the network, since the lens mechanisms built-into the lens main body, the drive control units built-into the lens main body for drive-controlling the lens mechanisms, the control unit that outputs the drive control signal to the drive control units, and the network that forms the communication interface for the control unit are provided.

The connection mode between a plurality of lens devices and the operation terminal can be expanded to the n-to-one mode, so that, in a case of industrial cameras and the like requiring a real-time property in response, it is possible to instantly correspond to a case where a plurality of lens devices are to be synchronized or an arbitrary number of lens devices are selected and drive-controlled among a plurality of lens devices.

Since the lens device according to the present invention can be operated from the operation terminal independently from the camera main body, it is possible to control a plurality of lens devices and to observe the information of each of the lens devices in real time.

Since the lens device is drive-controlled independently from the camera main body according to the drive control signals from the control unit, it is possible to employ a configuration where a plurality of lens devices are aggregated via the network to be connected to a single operation terminal or a plurality of operation terminals are connected to the network that has a plurality of lens devices. Therefore, it is possible to expand the range of application of the lens device.

The operation terminal that controls the lens device stores the lens positions of the lens mechanisms set in advance, so that it is possible to control the lens to be at a prescribed position at a high speed by reading out the stored lens positional information in inspections and the like performed by image processing.

Furthermore, since the operation terminal that controls the lens device can receive the lens action completion signals of the lens mechanisms in real time, high-speed processing can be performed in the inspection device that performs inspections by processing the image from the camera main body.

The present invention can be embodied in many forms without departing from the scope of the essential features thereof. Therefore, it is needless to say that the embodiments described above are for illustrative purpose only, and not intended to limit the present invention.

What is claimed is:

1. A lens device having a lens main body that is configured to be optically physically coupled to a camera main body, the lens device comprising:
    a lens mechanism that is built into the lens main body, the lens mechanism forming an optical image;
    a first interface configured to be communicably connected to an operation terminal via a network;
    a second interface configured to output an action completion signal to the operation terminal without going through the network; and
    a microcomputer configured to be programed to:
        receive a moving action command from the operation terminal via the first interface;
        control a drive controller to cause the lens mechanism to perform a moving action in response to the reception of the moving action command;
        determine whether the moving action in the lens mechanism has been completed; and
        output the action completion signal to the operation terminal via the second interface to notify the completion of the moving action in the lens mechanism.

2. The lens device according to claim 1,
    wherein the lens main body is drive-controlled independently from the camera main body based on the moving action command.

3. The lens device according to claim 1,
    wherein the lens device is configured with a plurality of the lens devices,
    the operation terminal is configured with one or more of the operation terminals, and
    the plurality of the lens devices are connected to the one or more of the operation terminals.

4. The lens device according to claim 1, further comprising:
    a power supply interface configured to supply power to the lens main body.

5. A lens device embedded system, comprising:
    a camera main body configured to capture an optical image;
    a lens device having a lens main body that is configured to be optically physically coupled to the camera main body; and
    an operation terminal configured to control the lens device, wherein
    the lens device further has:
        a lens mechanism that is built into the lens main body, the lens mechanism forming the optical image;
        a first interface configured to be communicably connected to the operation terminal via a network;
        a second interface configured to output an action completion signal to the operation terminal without going through the network; and
        a microcomputer configured to be programed to:
            receive a moving action command from the operation terminal via the first interface;
            control a drive controller to cause the lens mechanism to perform a moving action in response to the reception of the moving action command;
            determine whether the moving action in the lens mechanism has been completed; and
            output the action completion signal to the operation terminal via the second interface to notify the completion of the moving action in the lens mechanism.

6. The lens device embedded system according to claim 5,
    wherein the lens main body is controlled independently from the camera main body based on the moving action command.

7. The lens device embedded system according to claim 5,
    wherein the lens device is configured with a plurality of the lens devices,
    the operation terminal is configured with one or more of the operation terminals, and
    the plurality of the lens devices are connected to the one or more of the operation terminals.

8. The lens device embedded system according to claim 5, further comprising:
    a power supply interface configured to supply power to the lens main body.

9. A lens device embedded inspection device configured to perform an inspection of an inspection target, the lens device embedded inspection device comprising:
    a camera main body configured to capture an optical image;
    a lens device having a lens main body that is configured to be optically physically coupled to the camera main body; and
    an operation terminal configured to control the lens device, wherein
    the lens device further has:
        a lens mechanism that is built into the lens main body, the lens mechanism forming the optical image;
        a first interface configured to be communicably connected to the operation terminal via a network;
        a second interface configured to output an action completion signal to the operation terminal without going through the network; and
        a microcomputer configured to be programed to:
            receive a moving action command from the operation terminal via the first interface;
            control a drive controller to cause the lens mechanism to perform a moving action in response to the reception of the moving action command;
            determine whether the moving action in the lens mechanism has been completed; and
            output the action completion signal to the operation terminal via the second interface to notify the completion of the moving action in the lens mechanism.

10. The lens device embedded inspection device according to claim 9, wherein the lens main body is drive-controlled independently from the camera main body based on the moving action command.

11. The lens device embedded inspection device according to claim 9,
wherein the lens device is configured with a plurality of the lens devices,
the operation terminal is configured with one or more of the operation terminals, and
the plurality of the lens devices are connected to the one or more of the operation terminals.

12. The lens device embedded inspection device according to claim 2, further comprising:
a power supply interface configured to supply power to the lens main body.

13. A non-transitory computer-readable medium storing an operation program for controlling a lens device, the lens device having:
a lens mechanism that is built into a lens main body, the lens mechanism forming an optical image;
a first interface configured to be communicably connected to an operation terminal via a network; and
a second interface configured to output an action completion signal to the operation terminal without going through the network, the non-transitory computer-readable medium for causing a computer to execute a process by a processor so as to perform the steps of:
receiving a moving action command from the operation terminal via the first interface;
causing the lens mechanism to perform a moving action in response to the reception of the moving action command;
determining whether the lens moving action in the lens mechanism has been completed; and
outputting the action completion signal to the operation terminal via the second interface to notify the completion of the moving action in the lens mechanism.

14. The non-transitory computer-readable medium according to claim 13, further comprising the steps of:
storing a lens position of the lens mechanism as address information; and
reading out, via the first interface, the address information of the lens mechanism, and outputting another command for moving the lens mechanism to a moving position of the read-out address information to the lens device.

15. The non-transitory computer-readable medium according to claim 13,
wherein the lens device is configured with a plurality of the lens devices,
the operation terminal is configured with one or more of the operation terminals, and
the plurality of the lens devices are connected to the one or more of the operation terminals.

16. The non-transitory computer-readable medium according to claim 13,
wherein the lens device further has a power supply interface configured to supply power to the lens main body.

* * * * *